United States Patent
Kawahito

(10) Patent No.: US 12,429,585 B2
(45) Date of Patent: Sep. 30, 2025

(54) DISTANCE IMAGE MEASURING DEVICE

(71) Applicant: NATIONAL UNIVERSITY CORPORATION SHIZUOKA UNIVERSITY, Shizuoka (JP)

(72) Inventor: Shoji Kawahito, Hamamatsu (JP)

(73) Assignee: NATIONAL UNIVERSITY CORPORATION SHIZUOKA UNIVERSITY (JP)

(*) Notice: Subject to any disclaimer, the term of this patent is extended or adjusted under 35 U.S.C. 154(b) by 953 days.

(21) Appl. No.: 17/621,386

(22) PCT Filed: Jun. 24, 2020

(86) PCT No.: PCT/JP2020/024863
§ 371 (c)(1),
(2) Date: Dec. 21, 2021

(87) PCT Pub. No.: WO2020/262476
PCT Pub. Date: Dec. 30, 2020

(65) Prior Publication Data
US 2022/0357445 A1    Nov. 10, 2022

(30) Foreign Application Priority Data
Jun. 25, 2019    (JP) ................. 2019-117468

(51) Int. Cl.
*G01S 17/10*    (2020.01)
*G01S 7/4863*    (2020.01)
(Continued)

(52) U.S. Cl.
CPC ............ *G01S 17/10* (2013.01); *G01S 7/4863* (2013.01); *G01S 7/4865* (2013.01); *G01S 7/4876* (2013.01)

(58) Field of Classification Search
CPC ...... G01S 17/10; G01S 7/4863; G01S 7/4876; G01S 7/4865
See application file for complete search history.

(56) References Cited

U.S. PATENT DOCUMENTS

| 10,116,925 B1 | 10/2018 | Wang et al. |
| 2018/0064399 A1* | 3/2018 | Buettgen ............ A61B 5/7228 |
| 2018/0338127 A1 | 11/2018 | Wang et al. |

FOREIGN PATENT DOCUMENTS

| CN | 102378920 A | 3/2012 |
| CN | 106067954 A | 11/2016 |

(Continued)

OTHER PUBLICATIONS

Extended European Search Report dated May 22, 2023 issued in corresponding European Patent Application No. 20832072.1.
(Continued)

*Primary Examiner* — Luke D Ratcliffe
*Assistant Examiner* — Clara G Chilton
(74) *Attorney, Agent, or Firm* — OSTROLENK FABER LLP

(57) ABSTRACT

A distance image sensor including a light source that generates pulsed light, a light source control means that controls the light source, a pixel circuit including a photoelectric conversion region, charge reading regions, a charge discharging region, and control electrodes, a charge transfer control means that outputs control pulses to the control electrodes, and a distance calculation means that reads voltages of the charge reading regions as detection signals and repeatedly calculates a distance on the basis of the detection signals. The charge transfer control means sets a timing at which the control pulse is output to be before a timing at which the pulsed light is generated.

6 Claims, 17 Drawing Sheets

(51) Int. Cl.
    *G01S 7/4865* (2020.01)
    *G01S 7/487* (2006.01)

(56) References Cited

FOREIGN PATENT DOCUMENTS

| | | | |
|---|---|---|---|
| CN | 106471391 A | 3/2017 | |
| CN | 106662641 A | 5/2017 | |
| CN | 107533128 A | 1/2018 | |
| CN | 107710015 A | 2/2018 | |
| CN | 109085606 A | 12/2018 | |
| CN | 109324318 A | 2/2019 | |
| CN | 111226434 A | 6/2020 | |
| CN | 113287037 A | 8/2021 | |
| EP | 2402783 A1 | 1/2012 | |
| JP | 2010-032425 A | 2/2010 | |
| JP | 2018-185179 A | 11/2018 | |
| WO | WO 2016/208214 A1 | 12/2016 | |
| WO | WO 2017/098725 A1 | 6/2017 | |
| WO | WO-2019078366 A1 * | 4/2019 | ............ G01B 11/14 |

OTHER PUBLICATIONS

English translation of the International Preliminary Report on Patentability (IPRP) (Chapter 1) mailed Dec. 30, 2021with a Notification from the International Bureau (Form PCT/IB/338) in corresponding PCT International Application No. PCT/JP2020/024863.

Zhang Zhen, Cheng Xiangai, Jiang Zongfu et al.: "Investigation into the Dynamical Subordinate Facula in the Video of the CCD irradiated by High Repetition Pulses Laser", Applied Laser, vol. 30, No. 1, Feb. 2010, pp. 45-49, English translation of Abstract.

* cited by examiner

DISTANCE IMAGE MEASURING DEVICE

CROSS-REFERENCE TO RELATED APPLICATIONS

The present application is a 35 U.S.C. §§ 371 national phase conversion of International Application No. PCT/JP2020/024863, filed Jun. 24, 2020, which claims priority to Japanese Patent Application No. 2019-117468, filed Jun. 25, 2019, the contents of both of which are incorporated herein by reference. The PCT International Application was published in the Japanese language.

TECHNICAL FIELD

The present invention relates to a distance image measuring device that generates a distance image including distance information for each pixel.

BACKGROUND ART

Patent Literature 1 discloses a sensor device that generates a distance image including distance information using a time of flight of light. This sensor device irradiates an object with a sequence of first to fifth pulses as irradiation pulses in first to fifth frames arranged on a time axis. This sensor device generates a distance image using reflected light from the object caused by the radiated light. The distance image includes information on a distance to the object in a pixel array.

CITATION LIST

Patent Literature

[Patent Literature 1] Japanese Unexamined Patent Publication No. 2010-32425

SUMMARY OF INVENTION

Technical Problem

When an object is near a measuring device, strong reflected light may be incident on the measuring device from the object. After this reflected light is reflected inside the measuring device, the reflected light is incident on a photodetector at a position different from an image position of the object. Such incidence causes so-called flare. In the measuring device, flare can be noise.

The present invention provides a distance image measuring device capable of curbing an influence of flare.

Solution to Problem

A distance image measuring device according to an aspect of the present invention includes a light source configured to generate pulsed light; a light source control means configured to control the light source so that the light source generates the pulsed light periodically and repeatedly; a pixel circuit unit including a photoelectric conversion region for converting light into charge, first to M-th (M is an integer equal to or larger than 3) charge reading regions provided close to the photoelectric conversion region and separated from each other, a charge discharging region for discharging the charge, and first to M-th control electrodes provided in correspondence to the photoelectric conversion region and the first to M-th charge reading regions to receive first to M-th control pulses for charge transfer between the photoelectric conversion region and the first to M-th charge reading regions, and including an (M+1)-th control electrode provided in correspondence to the photoelectric conversion region and the charge discharging region to receive an (M+1)-th control pulse for charge transfer between the photoelectric conversion region and the charge discharging region; a charge transfer control means configured to output the first to M-th control pulses in correspondence to the generation of the pulsed light by the light source control means, and output the (M+1)-th control pulse to the (M+1)-th control electrode during a period other than an output period of the first to M-th control pulses; a voltage detection means configured to read voltages of the first to M-th charge reading regions of the pixel circuit unit as first to M-th detection signals after the output of the first to M-th control pulses by the charge transfer control means; and a distance calculation means configured to repeatedly calculate a distance on the basis of the first to M-th detection signals, wherein the charge transfer control means sets a timing at which the first control pulse is output to at least one of before a timing at which the pulsed light is generated and after the second to M-th control pulses are output.

The distance image measuring device outputs the second to M-th control pulses to the second to M-th control electrodes. As a result, charge generated in the photoelectric conversion region due to the light from the object is transferred to the second to M-th charge reading regions. The charges in the second to M-th charge reading regions are read as the second to M-th detection signals by the voltage detection means. The read charge is used for distance calculation in a distance calculation means. On the other hand, the distance image measuring device outputs the first control pulse to the first control electrode. Here, the timing at which the first control pulse is output is set to at least one of before the timing at which the pulsed light is generated and after the second to M-th control pulses are output. The charge transferred to the first charge reading region in response to the output of the first control pulse is due to background light. That is, at this time, the light caused by the pulsed light is not incident on the photoelectric conversion region. Alternatively, the light incident on the photoelectric conversion region is extremely weak. Therefore, it can be considered that the charge transferred to the first charge reading region does not include an influence of flare. As a result, according to correction using the first detection signal indicating a component of the background light, the influence of the flare is curbed in a corrected signal. Therefore, the distance image measuring device can curb the influence of flare.

In the aspect, the charge transfer control means may set timings of the second to M-th control pulses so that delay times of the second to M-th control pulses with respect to the timing at which the pulsed light is generated are shifted to different times for each of first to N-th (N is an integer equal to or larger than 2) subframe periods included in one frame period. According to this setting, it is possible to detect the charge using a large number of time windows having a small duty ratio. As a result, even when an object in various distance measurement ranges is a target, an influence of the background light on the detection signals is reduced. As a result, distance calculation with high distance resolution is realized. Further, it is also possible to prevent degradation of accuracy of distance calculation due to saturation of the detection signals due to strong background light.

In the aspect, the charge transfer control means may perform setting so that a rate of the number of outputs of at least the second control pulse among the second to M-th control pulses is decreased when delay times of the second to M-th control pulses with respect to the timing at which the pulsed light is generated becomes shorter during the second to N-th subframe periods. According to this setting, saturation of the detection signal can be prevented when an object in a short distance measurement range is a target. As a result, it is possible to improve a dynamic range of distance measurement.

In the aspect, the charge transfer control means may perform a first operation of setting the timing at which the first control pulse is output to after the second to M-th control pulses are output, and a second operation of setting the timing at which the first control pulse is output to after the second to M-th control pulses are output, and setting the timing at which the first control pulse is output to the same time as or after the timing at which the pulsed light is generated and before the second to M-th control pulses are output. According to this setting, it is possible to obtain the first detection signal including a component of the background light through the first operation. Through the second operation, it is also possible to obtain the first detection signal including a component of the background light and a component of the reflected light from the object. Therefore, since the number of signal components that can be used for distance calculation increases, it is possible to improve the accuracy of the distance calculation.

In the aspect, the charge transfer control means may set a timing at which the second control pulse is output to be after a standby time shorter than a duration of the pulsed light from the timing at which the pulsed light is generated. According to this setting, the second control pulse is delayed by the standby time from the timing at which the pulsed light is generated. Therefore, a component of flare incident on the photoelectric conversion region during the standby time is not transferred to the second charge reading region as a signal component. Therefore, it is possible to reduce an influence of flare on the second detection signal.

A distance image measuring device according to another aspect of the present invention includes a light source configured to generate pulsed light; a light source control means configured to control the light source so that the light source generates the pulsed light periodically and repeatedly; a pixel circuit unit including a photoelectric conversion region for converting light into charge, first to M-th (M is an integer equal to or larger than 3) charge reading regions provided close to the photoelectric conversion region and separated from each other, a charge discharging region for discharging the charge, and first to M-th control electrodes provided in correspondence to the photoelectric conversion region and the first to M-th charge reading regions to receive first to M-th control pulses for charge transfer between the photoelectric conversion region and the first to M-th charge reading regions, and including an (M+1)-th control electrode provided in correspondence to the photoelectric conversion region and the charge discharging region to receive an (M+1)-th control pulse for charge transfer between the photoelectric conversion region and the charge discharging region; a charge transfer control means configured to output the first to M-th control pulses to the first to M-th control electrodes in correspondence to the generation of the pulsed light by the light source control means, and output the (M+1)-th control pulse to the (M+1)-th control electrode during a period other than an output period of the first to M-th control pulses; a voltage detection means configured to read voltages of the first to M-th charge reading regions of the pixel circuit unit as first to M-th detection signals after the output of the first to M-th control pulses by the charge transfer control means; and a distance calculation means configured to repeatedly calculate a distance on the basis of the first to M-th detection signals. The charge transfer control means performs a third operation of setting a timing at which the first control pulse is output to at least one of before a timing at which the pulsed light is generated and after the second to M-th control pulses are output, and a fourth operation of setting a timing at which the first control pulse is output to the same time as or after the timing at which the pulsed light is generated and before the second to M-th control pulses are output.

The distance image measuring device of this other aspect can curb an influence of flare in a corrected signal when correction using the first detection signal indicating the component of the background light is performed, similar to the distance image measuring device according to the above aspect. Therefore, the distance image measuring device can curb the influence of the flare.

In another aspect, the charge transfer control means may perform setting so that the number of times of the third operation performed in one frame differs from the number of times of the fourth operation. According to this setting, it is possible to perform an operation of reducing an influence of flare.

In another aspect, the charge transfer control means may perform setting so that the delay times of the second to M-th control pulses with respect to the timing at which the pulsed light is generated in the third operation is the same as the delay time in the fourth operation, and perform setting so that the number of times of the third operation performed in one frame becomes larger than the number of times of the fourth operation. According to the third operation, it is possible to obtain the first detection signal in which an influence of flare can be ignored. According to the fourth operation, it is possible to obtain the first detection signal that can be used for distance calculation. By performing the third operation more than the fourth operation, it is possible to obtain a large number of first detection signals caused by the third operation. As a result, it is possible to obtain a calculation result in which an influence of flare is reduced.

In another aspect, the charge transfer control means may perform setting so that the delay times of the second to M-th control pulses with respect to the timing at which the pulsed light is generated in the third operation differs from the delay time in the fourth operation, and performs setting so that the number of times of the third operation performed in one frame is smaller than the number of times of the fourth operation. According to the third operation, it is possible to obtain the first detection signal in which an influence of flare can be ignored. According to the fourth operation, it is possible to obtain the first detection signal that can be used for distance calculation. Then, by performing the fourth operation more than the third operation, it is possible to obtain a large number of first detection signals caused by the fourth operation. As a result, since signal components used for distance calculation increases, it is possible to improve the accuracy of the distance calculation.

In the other form described above, the charge transfer control means may perform setting so that the number of times of the third operation performed in one frame becomes the same as the number of times of the fourth operation. With this setting, it is also possible to curb an influence of flare.

Advantageous Effects of Invention

According to the present invention, a distance image measuring device capable of reducing an influence of flare is provided.

DESCRIPTION OF EMBODIMENTS

Hereinafter, a mode for carrying out the present invention will be described in detail with reference to the accompanying drawings. In description of the drawings, the same elements are denoted by the same reference signs, and repeated description will be omitted.

First Embodiment

Figure 1:
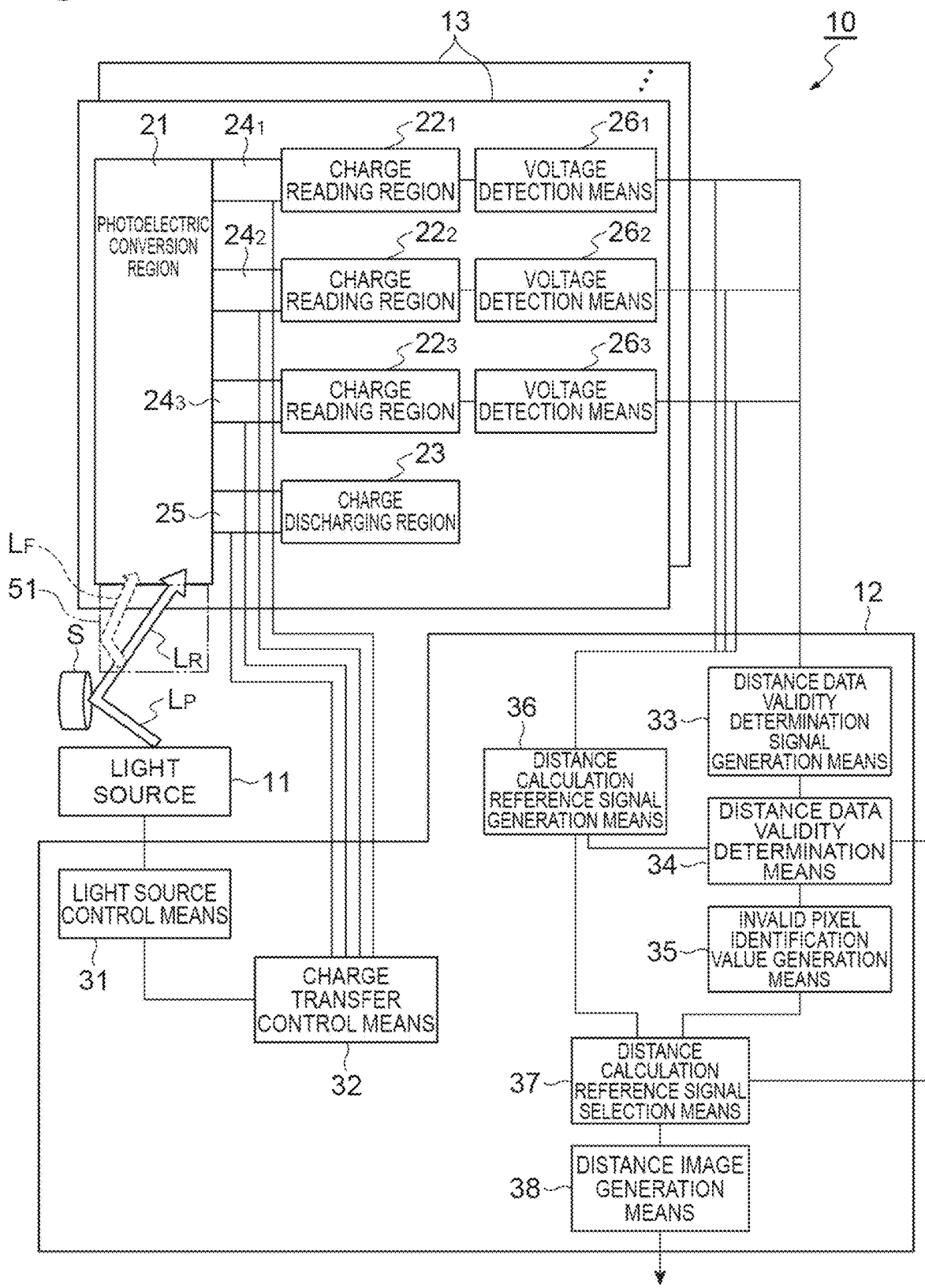
FIG. 1 is a block diagram illustrating a schematic configuration of a distance image sensor according to a first embodiment.

A function and configuration of a distance image sensor 10 according to a first embodiment of the distance image measuring device of the present invention will be described with reference to FIG. 1. The distance image sensor 10 uses a time of flight method to generate a distance image including distance information for each pixel. The distance image sensor 10 includes a light source 11, a calculation circuit 12, and a plurality of pixel circuits 13 (pixel circuit units). The distance image sensor 10 performs distance measurement based on a time of flight (TOF) scheme. The light source 11 generates a pulsed light $L_P$ that is radiated to an object S. The light source 11 includes, for example, a semiconductor light emitting element such as a light emitting diode or a laser diode, and a drive circuit that drives the semiconductor light emitting element. An element that generates light in a wavelength region such as a near infrared region or a visible light region can be used as the light source 11. The distance image sensor 10 includes the plurality of pixel circuits 13. The plurality of pixel circuits 13 are arranged in a two-dimensional array in directions in two dimensions (for example, a column direction and a row direction). The plurality of pixel circuits 13 constitute an image sensor. The plurality of pixel circuits 13 generate a detection signal by photoelectrically converting the incident pulsed light $L_R$ generated by the pulsed light $L_P$ being reflected by the object S. The distance image sensor 10 also includes the calculation circuit 12. The calculation circuit 12 calculates distance information regarding the object S for each pixel by using the detection signals generated by the plurality of pixel circuits 13. The calculation circuit 12 generates and outputs a distance image including two-dimensional image information reflecting the distance information for each pixel. The calculation circuit 12 may include a dedicated integrated circuit such as a one-chip microcomputer including a CPU, a RAM, a ROM, an input and output device, and the like. Further, the calculation circuit 12 may include a general-purpose computer such as a personal computer.

Hereinafter, configurations of the pixel circuit 13 and the calculation circuit 12 will be described in detail.

A configuration of the pixel circuit 13 will be described. The pixel circuit 13 includes semiconductor elements. The pixel circuit 13 includes a photoelectric conversion region 21, charge reading regions $22_1$ to $22_3$, a charge discharging region 23, control electrodes $24_1$ to $24_3$, a control electrode 25, and voltage detection means $26_1$ to $26_3$. The photoelectric conversion region 21 converts the incident pulsed light $L_R$ into charge. The charge reading regions $22_1$ to $22_3$ and the charge discharging regions 23 are close to the photoelectric conversion region 21. Further, the charge reading regions $22_1$ to $22_3$ and the charge discharging regions 23 are separated from each other. The control electrodes $24_1$ to $24_3$ and the control electrode 25 are provided in correspondence to the charge reading regions $22_1$ to $22_3$ and the charge discharging region 23. The control electrodes $24_1$ to $24_3$ and the control electrode 25 receive control pulses for charge transfer between the photoelectric conversion region 21 and the respective regions. The voltage detection means $26_1$ to $26_3$ read detection signals from the respective charge reading regions $22_1$ to $22_3$. The voltage detection means $26_1$ to $26_3$ are, for example, amplifiers each including a source follower amplifier. The voltage detection means $26_1$ to $26_3$ selectively detect and amplify voltages based on reference potentials of the respective charge reading regions $22_1$ to $22_3$ under control of the calculation circuit 12. The voltage detection means $26_1$ to $26_3$ output the amplified voltage as a detection signal to the calculation circuit 12.

The pixel circuit 13 is formed on a p-type semiconductor substrate such as a silicon substrate. The photoelectric conversion region 21 is provided in a central portion of a pixel formation region. The pixel formation region is formed on the p-type semiconductor substrate. The pixel formation region includes an active region forming layer made of a p-type semiconductor, an n-type surface embedded region, a p-type pinning layer, and an insulating film. The n-type charge reading regions $22_1$ to $22_3$ and the charge discharging regions 23, which have a higher impurity concentration than the n-type surface embedded region, are formed at positions separated from each other and close to the photoelectric conversion region 21. The control electrodes $24_1$ to $24_3$ and 25 are provided on respective charge transfer paths from the photoelectric conversion region 21 on the insulating film to the charge reading regions $22_1$ to $22_3$ and the charge discharging region 23, respectively. The control electrodes $24_1$ to $24_3$ and 25 may be provided on the charge transfer path, respectively. The control electrodes $24_1$ to $24_3$ and 25 may be separately provided in a plurality of electrode portions to sandwich the charge transfer path from both sides thereof.

The calculation circuit 12 outputs control pulses having different phases to the control electrodes $24_1$ to $24_3$ and 25. Accordingly, a depletion potential of the surface embedded region changes sequentially. Therefore, a potential gradient is sequentially formed so that charge is transported to any one of the charge transfer paths. As a result, majority carriers (charges) generated in the surface embedded region of the photoelectric conversion region 21 move to either the charge reading regions $22_1$ to $22_3$ or the charge discharging region 23.

Next, a configuration of the calculation circuit 12 will be described. The calculation circuit 12 includes, as functional components, a light source control means 31, a charge transfer control means 32, a distance data validity determination signal generation means 33, a distance data validity determination means 34, an invalid pixel identification value generation means 35, a distance calculation reference signal generation means 36, a distance calculation reference signal selection means 37, and a distance image generation means 38. The distance data validity determination signal generation means 33, the distance data validity determination means 34, the invalid pixel identification value generation means 35, the distance calculation reference signal generation means 36, the distance calculation reference signal selection means 37, and the distance image generation means 38 constitute a distance calculation means of the present embodiment.

The light source control means 31 of the calculation circuit 12 controls a timing of the pulsed light $L_P$ of the light source 11, an intensity of the pulsed light $L_{Pp}$, and a pulse width of the pulsed light $L_P$. Specifically, the light source control means 31 periodically and repeatedly generates the pulsed light $L_P$ having a duration $T_0$ (a first duration) within a period of one frame, which is a repetition period of preset distance calculation. The charge transfer control means 32 outputs control pulses $G_1$ to $G_3$ and a control pulse $G_D$ to respective control electrodes $24_1$ to $24_3$ and 25. That is, the charge transfer control means 32 outputs the control pulses $G_1$ to $G_3$ to the control electrodes $24_1$ to $24_3$ only during a duration $T_1$ (second duration) corresponding to the duration $T_0$. A timing at which the control pulses $G_1$ to $G_3$ are output corresponds to a timing at which each of pulsed light $L_P$ is generated within one frame period. In the present embodiment, the duration $T_1$ may be equal to the duration $T_0$. The charge transfer control means 32 outputs the control pulse $G_D$ to the control electrode 25 during a period other than the timing at which the control pulses $G_1$ to $G_3$ are output. The control pulse $G_D$ discharges the charge accumulated in the photoelectric conversion region 21 to the charge discharging region 23.

When a resolution of distance calculation using a time of flight of the pulsed light $L_P$ is 15 cm, this resolution is equivalent to 1 nanosecond when the resolution is converted to a time of flight. In order to realize this resolution, a control means having time accuracy on the order of picoseconds is required as a guide. Therefore, the charge transfer control means 32 and the light source control means 31 need to be formed integrally with the pixel circuit 13 and designed in consideration of a wiring capacity or the like. Accordingly, it is desirable for the charge transfer control means 32 and the light source control means 31 to be formed in a semiconductor integrated with the pixel circuit 13. The "integrated semiconductor" also includes different semiconductors in a plurality of semiconductor layers laminated by using a silicon on insulator (SOI) technology or a through silicon via (TSV) technology. Specifically, a circuit between the charge transfer control means 32, the charge transfer control means 32 and the control electrodes $24_1$ to $24_3$, and 25, and a part of a circuit between the charge transfer control means 32 and the light source control means 31 may be formed in the same semiconductor as that of the pixel circuit 13. Alternatively, these may be formed in a semiconductor layer laminated together with the pixel circuit 13.

The distance calculation means of the calculation circuit 12 repeatedly executes the calculation of the distance for each pixel circuit 13 for each frame, which is a preset distance calculation repetition period. The distance calculation means repeatedly generates a distance image including distance information. The distance data validity determination signal generation means 33 generates a distance data validity determination signal $S_{A12}$ on the basis of detection signals $S_1$ to $S_3$ output from the pixel circuit 13 in correspondence to the timing of the pulsed light $L_P$. The distance data validity determination signal $S_{A12}$ is a sum of a signal components of charge generated from the incident pulsed light $L_R$ obtained by subtracting a signal component of the background light among detection signals $S_2$ and $S_3$. The distance data validity determination signal $S_{A12}$ indicates whether or not the detection signals $S_2$ and $S_3$ have strongly reflected the incident pulsed light $L_R$. The distance data validity determination signal $S_{A12}$ is a signal for determining whether or not the calculation of the distance based on the detection signals $S_2$ and $S_3$ is valid. The distance data validity determination means 34 determines whether or not the calculation of the distance based on the detection signals $S_2$ and $S_3$ is valid, on the basis of the distance data validity determination signal $S_{A12}$. Specifically, the distance data validity determination means 34 compares the distance data validity determination signal $S_{A12}$ with a predetermined threshold value (first threshold value) $Th_1$. The distance data validity determination means 34 determines that the distance calculation is valid when a result of the comparison is that the distance data validity determination signal $S_{A12}$ exceeds a threshold value $Th_1$. On the other hand, the distance data validity determination means 34 determines that the distance calculation is invalid when the result of the comparison is that the distance data validity determination signal $S_A$ is equal to or smaller than the threshold value $Th_1$. The invalid pixel identification value generation means 35 generates an identification value on the basis of a determination result of the distance data validity determination means 34. The identification value indicates whether or not the calculation of the distance is invalid for each pixel corresponding to the pixel circuit 13.

The distance calculation reference signal generation means 36 generates a distance calculation reference signal $D_{A12}$ based on the distance calculation, on the basis of the detection signals $S_2$ and $S_3$ output from the pixel circuit 13 in correspondence to the timing of the pulsed light $L_P$. Specifically, the distance calculation reference signal generation means 36 generates the distance calculation reference signal $D_{A12}$ by using a ratio between a difference between the two detection signals $S_2$ and $S_3$ and the distance data validity determination signal $S_{A12}$. The distance calculation reference signal selection means 37 determines whether or not a position of the object S is included in the range in which measurement is possible, on the basis of the distance calculation reference signal $D_{A12}$. The distance calculation reference signal selection means 37 outputs the distance calculation reference signal $D_{A12}$ as a valid value to the distance image generation means 38 when a determination is made that the position is included in the range in which measurement is possible. For example, the distance calculation reference signal selection means 37 compares a value of the distance calculation reference signal $D_{A12}$ with predetermined threshold values (second and third threshold values) $Th_2$ and $Th_3$. The distance calculation reference signal selection means 37 determines whether the distance calculation reference signal $D_{A12}$ is valid or invalid according to a result of the comparison. When the distance image generation means 38 determines that the distance calculation is valid, the distance image generation means 38 calculates the distance information by referring to the distance calculation reference signal $D_{A12}$. The distance image generation means 38 generates a distance image including the distance information corresponding to each pixel circuit 13. The distance image is output to an external device. Examples of the external device, which is an output destination, include an output device such as a display device and a communication interface device. The distance image generation means 38 can embed an invalid value in a pixel in which an identification value indicating that the distance information is invalid has been generated. Further, the distance image generation means 38 can also embed an invalid value for pixels for which it has been determined that the distance calculation reference signal $D_{A12}$ is not included in the range in which measurement is possible.

Figure 2:
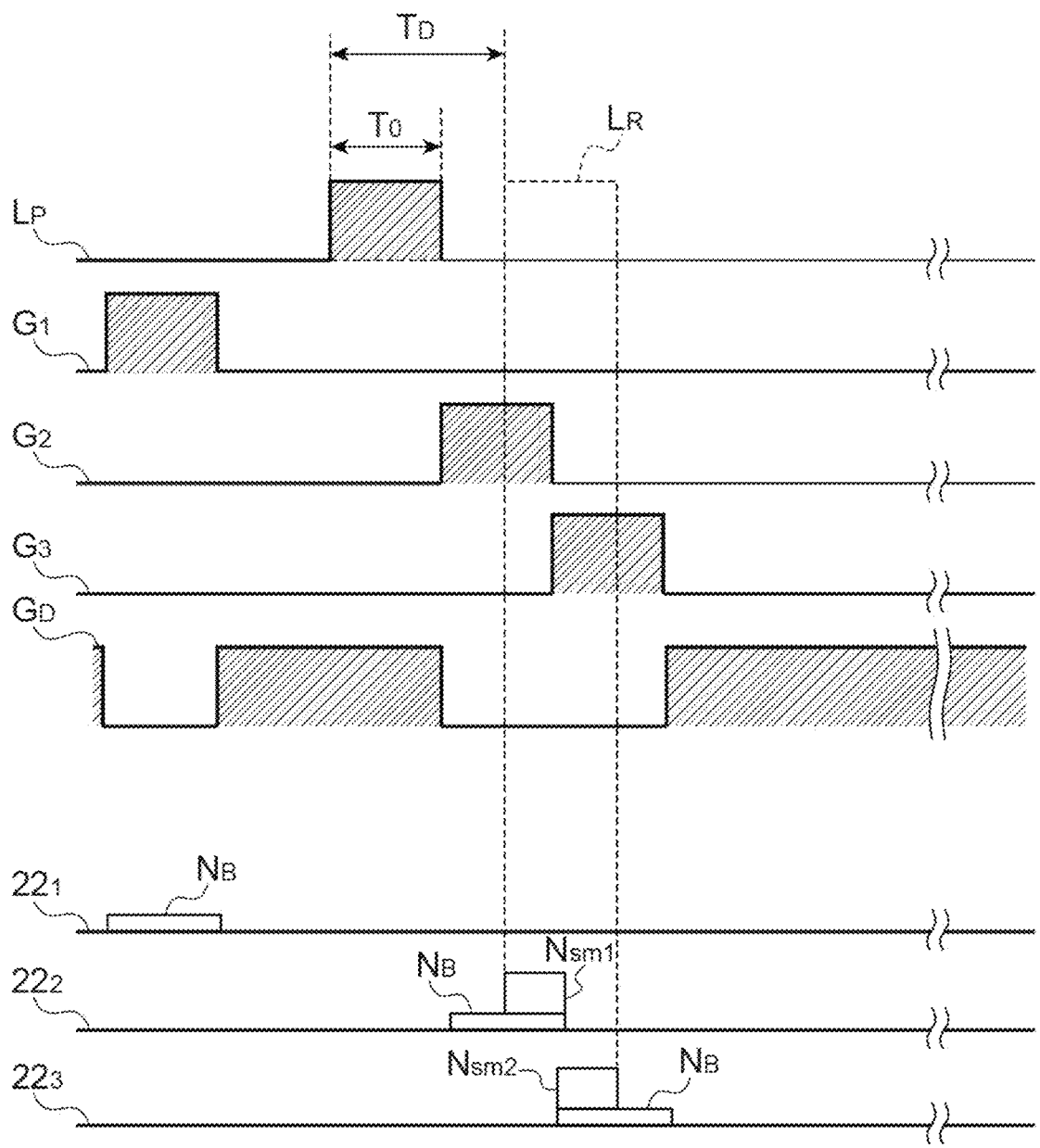
FIG. 2 is a timing chart for explaining a principle of distance calculation in the distance image sensor of FIG. 1.

FIG. 2 is a timing chart for explaining a principle of distance calculation in the distance image sensor 10. FIG. 2 illustrates timings of various signals that are controlled by the distance image sensor 10. Further, FIG. 2 illustrates a timing at which charges are accumulated in each region of the pixel circuit 13. FIG. 2 illustrates the timing of the pulsed light $L_P$, timings of the control pulses $G_1$ to $G_3$, a timing of the control pulse $G_D$, and a timing at which charge is accumulated in the charge reading regions 22$_1$ to 22$_3$ in order from the top. Thus, the control pulses $G_2$ to $G_3$ are output with the duration $T_0$ so that the control pulses $G_2$ to $G_3$ overlap each other in correspondence to a timing of the duration $T_0$ of the pulsed light $L_P$. The control pulse $G_D$ is output at a timing at which the control pulses $G_1$, $G_2$, and $G_3$ are not output. According to such control, the charge accumulated in the photoelectric conversion region 21 due to the photoelectric conversion of the incident pulsed light $L_R$ is distributed to the two charge reading regions 22$_2$ and 22$_3$ at a proportion corresponding to a delay time $T_D$ of the incident pulsed light $L_R$ with respect to the pulsed light $L_P$. On the other hand, the timing of the control pulse $G_1$ is earlier than the timing of the pulsed light $L_P$. As a result, only charge having an amount of charge $N_B$ caused by noise such as background light and a dark current is transported to the charge reading region 22$_1$ in a time window defined by the control pulse $G_1$. On the other hand, charge obtained by adding an amount of charge $N_{sm1}$ distributed in correspondence to the delay time $T_D$ to the amount of charge $N_B$ is transported to the charge reading region 22$_2$ in a time window defined by the control pulse $G_2$. On the other hand, charge obtained by adding an amount of charge $N_{sm2}$ distributed in correspondence to the delay time $T_D$ to the amount of charge $N_B$ is transported to the charge reading region 22$_3$ in a time window defined by the control pulse $G_3$. Using such a phenomenon, the calculation circuit 12 of the distance image sensor 10 calculates a ratio of the amount of charge $N_{sm1}$ obtained by subtracting the amount of charge $N_B$ and the amount of charge $N_{sm2}$ obtained by subtracting the amount of charge $N_B$ according to each timing of the pulsed light $L_P$. As a result, the calculation circuit 12 of the distance image sensor 10 can calculate the distance of the object S corresponding to the delay time $T_D$.

Next, details of a distance calculation procedure in the distance image sensor 10 will be described. A distance image measuring method to be described below is also referred to as a "3-tap 1-zone method".

Figure 3:
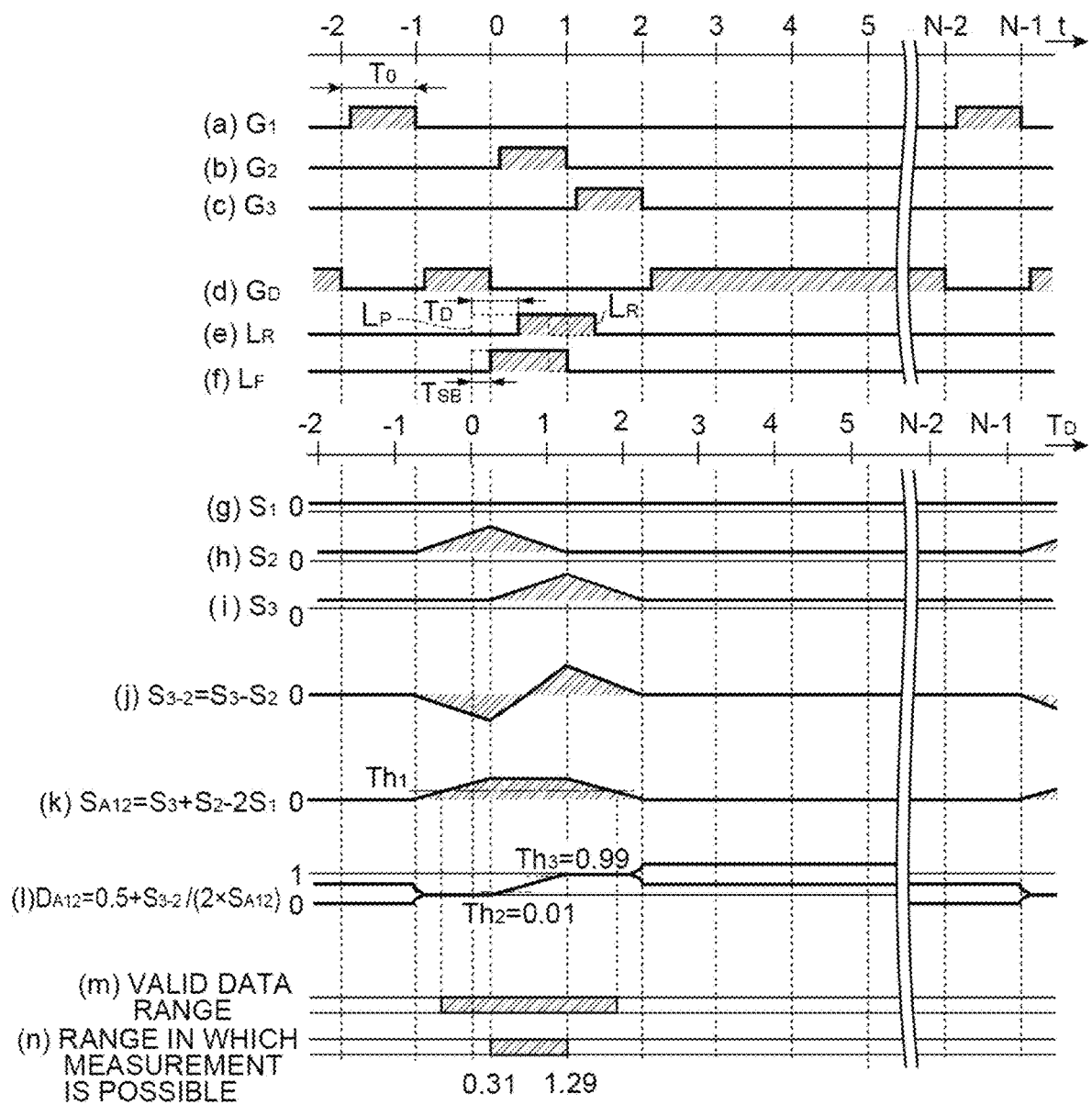
FIG. 3 is a timing chart of various signals handled by the distance image sensor of FIG. 1 and a graph illustrating changes in various values calculated by the distance image sensor with respect to a delay time.

FIG. 3 is a timing chart of various signals handled by the distance image sensor 10 and a graph illustrating changes in various calculated values with respect to the delay time $T_D$. FIGS. 3(a) to 3(f) are based on real time(t). On the other hand, FIGS. 3(g) to 3(n) are based on the delay time $T_D$. The delay time $T_D$ is a value standardized by the duration $T_0$ of the pulsed light $L_P$. The delay time $T_D$ is a time from reflection of the pulsed light $L_P$ on the object S and incidence thereof on the photoelectric conversion region 21 to entrance of the charge to the charge reading regions 22$_1$ to 22$_3$ from the photoelectric conversion region 21. In other words, FIGS. 3(g) to 3(n) are based on a time obtained by dividing a round-trip distance to the object S by a speed of light. That is, an axis of the delay time $T_D$ is an axis of a time proportional to the distance to the object S. FIGS. 3(a) to 3(d) illustrate timings of control pulses $G_1$ to $G_3$ and $G_D$. FIG. 3(e) illustrates a timing at which the pulsed light $L_P$ is emitted. This timing is called a "timing of the pulsed light $L_P$". Further, FIG. 3(e) illustrates a timing at which the incident pulsed light $L_R$ is incident on the photoelectric conversion region 21. This timing is called a "timing of the incident pulsed light $L_R$". FIG. 3(f) illustrates a timing at which stray light $L_F$ is incident on the photoelectric conversion region 21. This timing is called a "timing of the stray light $L_F$". FIGS. 3(g) to 3(i) illustrate values of the detection signals $S_1$ to $S_3$. FIG. 3(j) illustrates a value of a difference value $S_{3-2}$. FIG. 3(k) illustrates a value of the distance data validity determination signal $S_{A12}$. FIG. 3(l) illustrates the value of the distance calculation reference signal $D_{A12}$. FIG. 3(m) illustrates the valid data range. FIG. 3(n) illustrates the range in which measurement is possible.

The distance image sensor 10 starts a process of generating the distance image. The light source control means 31 controls the timing of the pulsed light $L_P$ within a period of one frame (light source control step). Further, the charge transfer control means 32 controls a timing at which the control pulses $G_1$ to $G_3$ and $G_D$ are output, within a period of one frame (charge transfer control step). Specifically, first, the charge transfer control means 32 sets durations of the control pulses $G_1$ to $G_3$ and $G_D$ to $T_1=T_0$. Then, the charge transfer control means 32 outputs the control pulse $G_1$ in a period from t=−2 to −1. The charge transfer control means 32 may exactly match a timing at which the output of the control pulse $G_1$ starts with t=−2, or may slightly delay the timing from t=−2. Then, the charge transfer control means 32 outputs the control pulse $G_D$ in a period from t=−1 to 0. Then, the charge transfer control means 32 outputs the control pulse $G_2$ in a period from t=0 to 1. Further, the light source control means 31 causes the pulsed light $L_P$ to be emitted from the light source 11 in a period from about t=0 to +1. More strictly, the light source control means 31 sets a timing at which the emission of the pulsed light $L_P$ is started to be slightly before t=0. Then, there is a standby time $T_{SB}$ between a timing at which the emission of the pulsed light $L_P$ is started and a timing when the output of the control pulse $G_2$ is started. Then, the charge transfer control means 32 outputs the control pulse $G_3$ in the period from t=+1 to +2. The charge transfer control means 32 outputs the control pulse $G_D$ in a period after t=+2. Thereafter, the voltage detection means $26_1$ to $26_3$ of each pixel circuit 13 read the detection signals $S_1$ to $S_3$. These detection signals $S_1$ to $S_3$ are output to the calculation circuit 12 (voltage detection step).

The charge transfer control means 32 sets the timing at which the control pulse $G_2$ is output to be after the standby time $T_{SB}$ from a timing at which the pulsed light $L_P$ is generated. The standby time $T_{SB}$ is shorter than the duration $T_0$ in which the pulsed light $L_P$ lasts. According to this setting, the control pulse $G_2$ is delayed by the standby time $T_{SB}$ from the timing at which the pulsed light $L_P$ is generated. Therefore, the stray light $L_F$ incident on the photoelectric conversion region 21 during the standby time $T_{SB}$ is not transferred to the charge reading region $22_2$ as a part of the detection signal $S_2$. Therefore, it is possible to reduce an influence of the stray light $L_F$ on the detection signal $S_2$.

Then, the calculation circuit 12 calculates the distance information for each pixel on the basis of the detection signals $S_1$ to $S_3$ output from the pixel circuit 13 (distance calculation step). That is, the distance data validity determination signal generation means 33 calculates the value of the distance data validity determination signal $S_{A12}$ using Equations (1) and (2) below on the basis of the detection signals $S_1$ to $S_3$.

$$S_{3-2}=S_3-S_2 \quad (1)$$

$$S_{A12}=S_3+S_2-2S_1 \quad (2)$$

In Equations (1) and (2) above, values (voltage values) of signals indicated by the detection signals $S_1$ to $S_3$ are indicated by symbols "$S_1$", "$S_2$", and "$S_3$". The same applies to the following description. The value of the distance data validity determination signal $S_{A12}$ is a value obtained by subtracting a component of the amount of charge $N_B$ from a sum of the values of the detection signals $S_2$ and $S_3$. A component of the amount of charge $N_B$ is caused by noise such as background light and a dark current. The component of the amount of charge $N_B$ corresponds to the detection signal $S_1$. The value of the distance data validity determination signal $S_{A12}$ is a sum of components of the detection signals $S_2$ and $S_3$ in which the incident pulsed light $L_R$ has been reflected. The distance data validity determination means 34 compares the value of the distance data validity determination signal $S_{A12}$ with the threshold value $Th_1$. The distance data validity determination means 34 determines whether the calculation of the distance using the detection signals $S_2$ and $S_3$ is valid or invalid. Specifically, the distance data validity determination means 34 determines a period of the distance data validity determination signal $S_{A12}$ having a value larger than the threshold value $Th_1$. Accordingly, a range illustrated in FIG. 3(m) is determined to be a range in which the calculation of the distance is valid. In other words, the range is determined to be a "valid data range".

Next, the distance calculation reference signal generation means 36 calculates the value of the distance calculation reference signal $D_{A12}$ using Equation (3) below.

$$D_{A12}=0.5+S_{3-2}/(2S_{A12}) \quad (3)$$

Then, the distance calculation reference signal selection means 37 determines whether or not the value of the distance calculation reference signal $D_{A12}$ is within a predetermined range. In other words, the distance calculation reference signal selection means 37 determines whether or not the object S is within the range in which measurement is possible. The distance calculation reference signal selection means 37 sets the threshold values $Th_2$ and $Th_3$ for determining the distance calculation reference signal $D_{A12}$. For example, the threshold value $Th_2$ is 0.01. The threshold value $Th_3$ is 0.99. The distance calculation reference signal selection means 37 obtains a time range in which the distance calculation reference signal $D_{A12}$ is equal to or larger than the threshold value $Th_2$ and equal to or smaller than the threshold value $Th_3$ as the range in which measurement is possible ($Th_2 \leq D_{A12} \leq Th_3$). As a result, t=0.31 to 1.29 can be obtained as the range in which measurement is possible. Through such a determination, it is possible to exclude, from the distance calculation, a case in which the object S is too close, the incident pulsed light $L_R$ deviates from the time window of the detection signal $S_2$, and the distance is not reflected in the value of the distance calculation reference signal $D_{A12}$. Further, it is possible to exclude, from the distance calculation, a case in which the object S is too far away, the incident pulsed light $L_R$ deviates from the time window of the detection signal $S_3$, and the distance is not reflected in the value of the distance calculation reference signal $D_{A12}$.

Finally, the distance image generation means 38 calculates the distance of the object S on the basis of the distance calculation reference signal $D_{A12}$, which is determined to be in the "valid data range" and is in the "range in which measurement is possible". As a result, a distance image including the distance information of each pixel is generated and output.

The distance image sensor 10 described above outputs the control pulses $G_2$ and $G_3$ to the control electrodes $24_2$ and $24_3$. As a result, the charge generated in the photoelectric conversion region 21 due to the incident pulsed light $L_R$ from the object S is transferred to the charge reading regions $22_2$ and $22_3$. The charge in the charge reading regions $22_2$ and $22_3$ is read as detection signals $S_2$ and $S_3$ by the voltage detection means 262 and $26_3$. The read detection signals $S_2$ and $S_3$ are used for calculation of the distance in the calculation circuit 12.

Here, an example of light caused by the pulsed light $L_P$ includes the incident pulsed light $L_R$ when the pulsed light $L_P$ is reflected by the object S and is incident on the distance image sensor 10. The incident pulsed light $L_R$ is directly incident on the photoelectric conversion region 21 included in the pixel at a position in which an image of the object S is formed from the object S. In other words, the incident pulsed light $L_R$ is not further reflected until the incident pulsed light $L_R$ reaches the photoelectric conversion region 21 from the object S. Therefore, the incident pulsed light $L_R$ can be used as a basis for calculating a distance from the object S to the distance image sensor 10.

The light caused by the pulsed light $L_P$ further includes the stray light $L_F$. The stray light $L_F$ is light obtained by light reflected by the object S being further reflected by an object different from the object S. The stray light $L_F$ may be caused, for example, by reflection in a lens arranged between the object S and the distance image sensor 10. Further, the stray light $L_F$ may be generated by reflection in a housing 51 accommodating the lens, the distance image sensor 10, and the like. In the present embodiment, the stray light $L_F$ is light obtained by reflection of the pulsed light $L_P$ on an object present at a close distance of the distance image sensor 10, and has a particularly large influence. This has a particularly large impact. A position in which such a stray light $L_F$ is incident does not correspond to the position of the object S. Therefore, the stray light $L_F$ cannot be used as a basis for calculating the distance from the object S to the distance image sensor 10. When the stray light $L_F$ is incident on the photoelectric conversion region 21 included in the pixel at a position different from a position in which the image of the object S is formed, flare is generated. That is, the stray light $L_F$ referred to in the present embodiment means noise light that cannot be used as a basis for distance calculation and can be noise in the distance calculation.

Therefore, the distance image sensor 10 of the first embodiment sets a time window (control pulse $G_1$) of one tap in a multi-tap to a place temporally separated from a timing at which the pulsed light $L_P$ is generated. The detection signal $S_1$ obtained in the time window (control pulse $G_1$) is used to correct the background light. The detection signals $S_2$ and $S_3$ obtained in another time window (the control pulses $G_2$ and $G_3$) are used to measure the distance.

More specifically, the distance image sensor 10 outputs the control pulse $G_1$ to the control electrode $24_1$. A timing at which the control pulse $G_1$ is output is before the timing at which the pulsed light $L_P$ is generated. According to this timing, the incident pulsed light $L_R$ caused by the pulsed light $L_P$ is not incident on the photoelectric conversion region 21. Further, the stray light $L_F$ is not incident on the photoelectric conversion region 21. That is, the charge transferred to the charge reading region $22_1$ according to the output of the control pulse $G_1$ is due to the background light. Therefore, it can be considered that the charge transferred to the charge reading region $22_1$ does not include an influence of flare. As a result, according to correction using the detection signal $S_1$ indicating the component of the background light, it can be considered that a corrected signal does not include the influence of the flare. Therefore, the distance image sensor 10 can curb the influence of the flare.

Second Embodiment

Figure 4A:
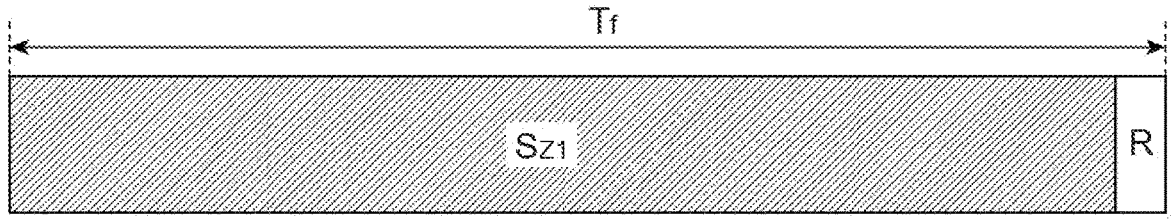
FIGS. 4(a)-4(c) are diagrams illustrating an operation of the distance image sensor of the first embodiment and a distance image sensor of a second embodiment.

The distance image sensor 10 of the first embodiment has been operated on the basis of the timings illustrated in FIG. 3. As illustrated in FIG. 4(a), the distance image sensor 10 of the first embodiment repeatedly executes the operation illustrated in FIG. 3 in one frame period ($T_f$), which is a repetition period of distance calculation of the calculation circuit 12. According to this operation, a measurement range of the distance image sensor 10 is only one range. The distance image sensor 10 of the second embodiment expands the measurement range to 2 or more. The expansion of the measurement range can be realized by introducing a subframe scheme.

That is, the distance image sensor 10 of the second embodiment employs a subframe for a short distance and a subframe for a long distance. The distance image sensor 10 of the second embodiment performs distance measurement by synthesizing results obtained for the respective subframes.

Figure 4B:
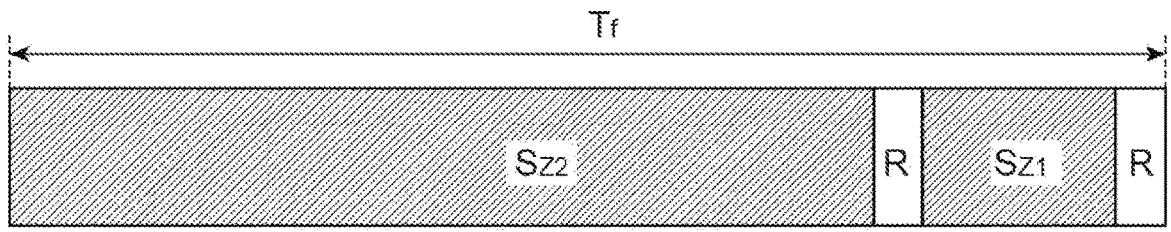
Figure 4C:
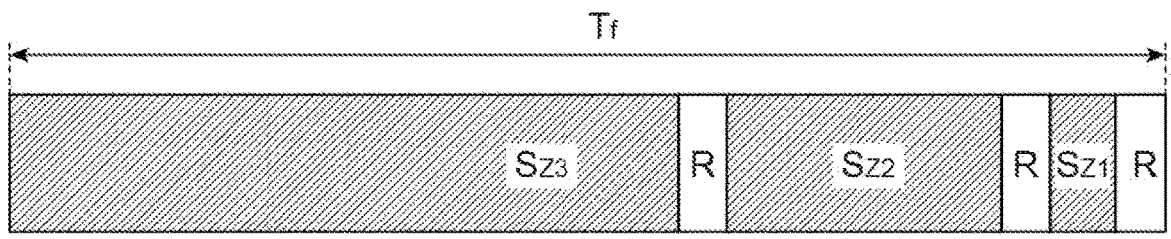

As illustrated in FIGS. 4(b) and 4(c), one frame period ($T_f$) may include two or more subframe periods $S_{Z1}$, $S_{Z2}$, and $S_{Z3}$, and a reading period R corresponding thereto. In the subframe period $S_{Z1}$, the object S at a relatively short distance from the distance image sensor 10 is a measurement target. In the subframe period $S_{Z3}$, the object S at a relatively far distance from the distance image sensor 10 is a measurement target. The measurement range is controlled by timings of the control pulses $G_2$ and $G_3$ based on the timing at which the pulsed light $L_P$ is generated.

For example, in the subframe period $S_{Z1}$, the distance image sensor 10 operates according to a timing illustrated in FIG. 3. In the subframe period $S_{Z2}$ in which the object S located at a position farther than the subframe period $S_{Z1}$ is a target, the distance image sensor 10 operates according to the timing illustrated in FIG. 5. In the subframe period $S_{Z3}$ in which the object S located at a position farther than the subframe period $S_{Z2}$ is a target, the distance image sensor 10 operates according to the timing illustrated in FIG. 6.

Figure 5:
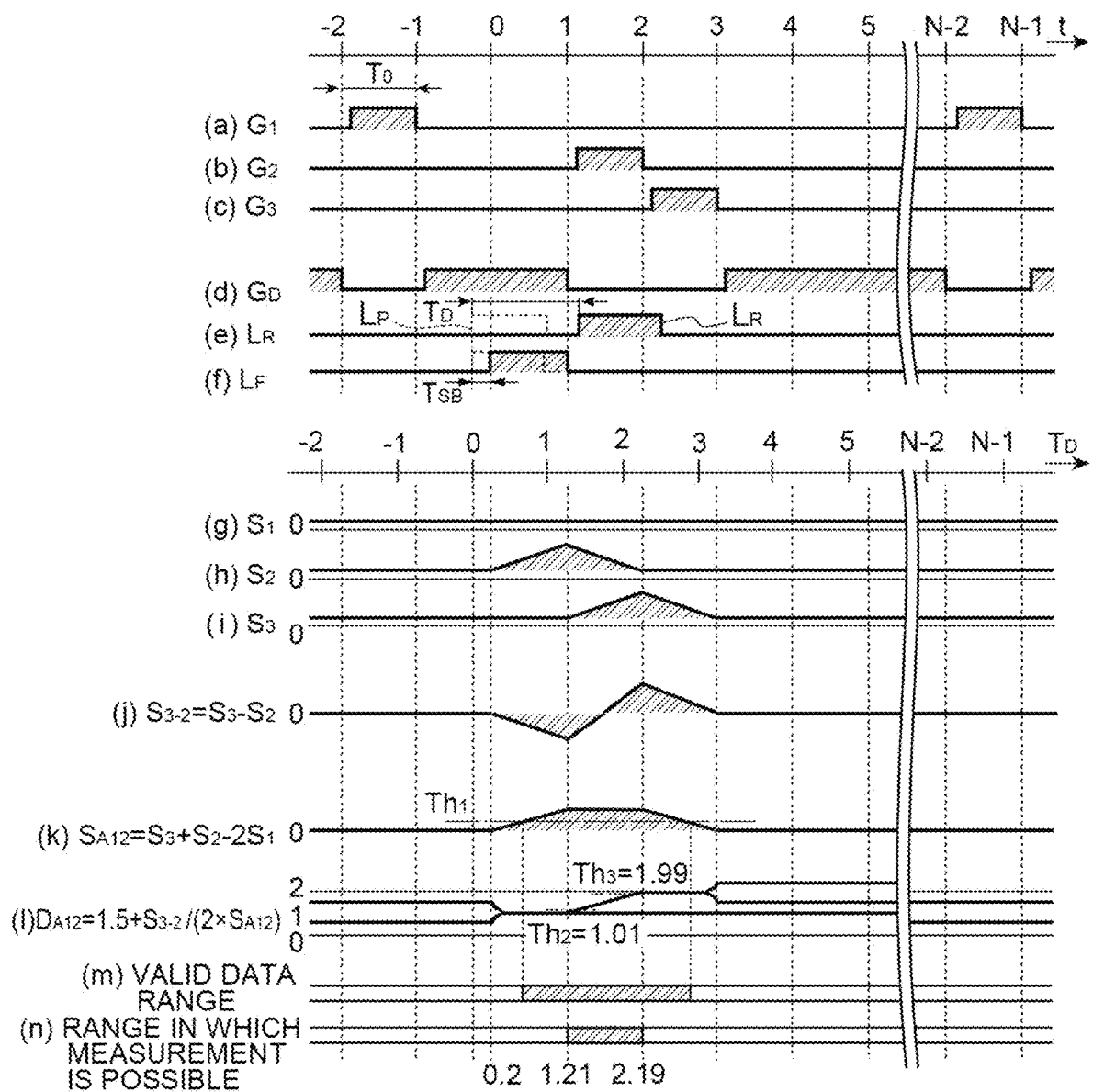
FIG. 5 is a timing chart of various signals handled by the distance image sensor of the second embodiment, and a graph illustrating changes in various values calculated by the distance image sensor with respect to the delay time.
Figure 6:
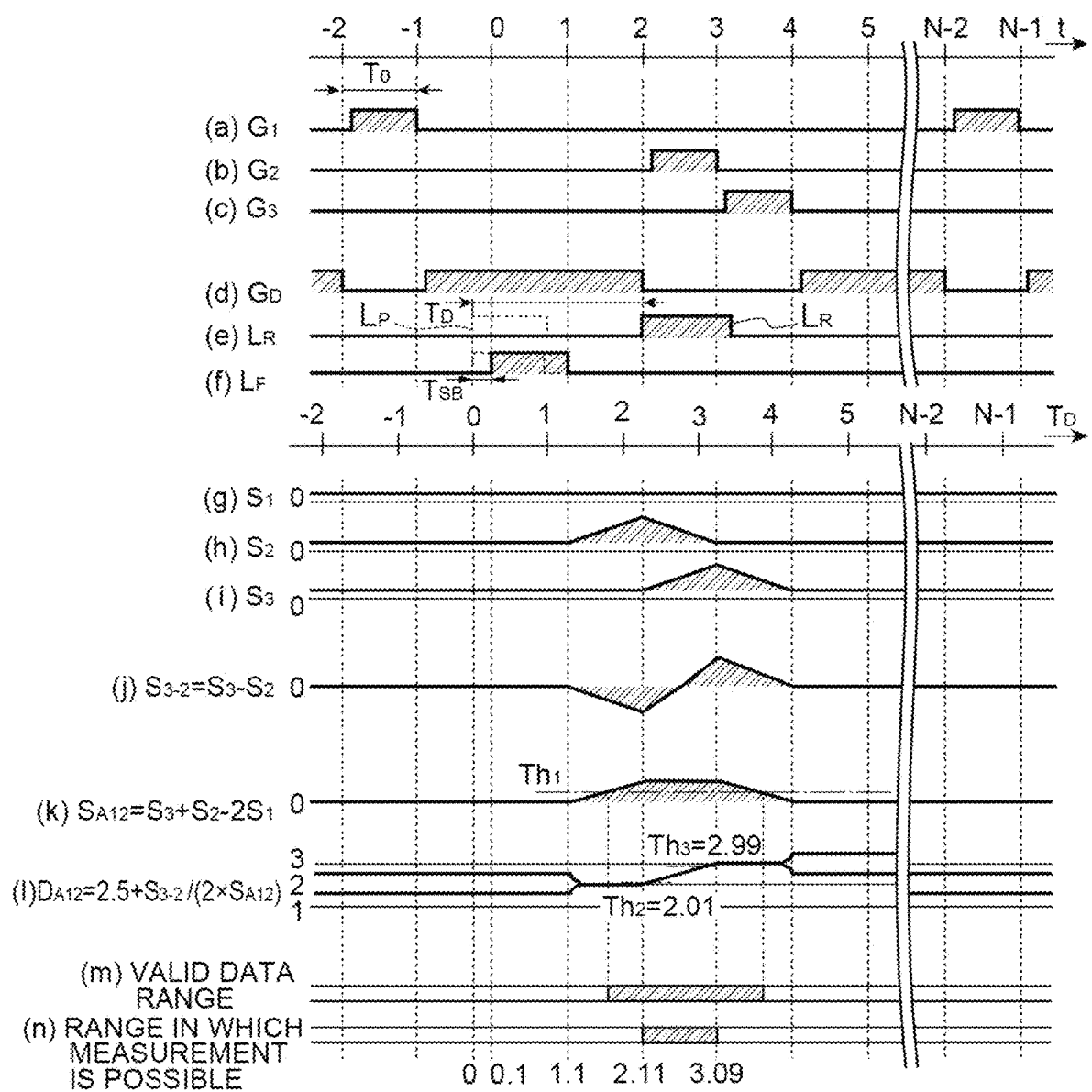
FIG. 6 is a timing chart of various signals handled by the distance image sensor of the second embodiment, and a graph illustrating changes in various values calculated by the distance image sensor with respect to the delay time.

FIGS. 5 and 6 are a timing chart of various signals handled by the distance image sensor 10 and a graph illustrating changes in various calculated values with respect to the delay time $T_D$. FIGS. 5(a) to 5(d) and 6(a) to 6(d) illustrate timings of the control pulses $G_1$ to $G_3$ and $G_D$. FIGS. 5(e) and 6(e) illustrate the timing of the pulsed light $L_P$ and the timing of the incident pulsed light $L_R$. FIGS. 5(f) and 6(f) illustrate a timing of the stray light $L_F$. FIGS. 5(g) to 5(i) and 6(g) to 6(i) illustrate the values of the detection signals $S_1$ to $S_3$. FIGS. 5(j) and 6(j) illustrate the value of the difference value $S_{3-2}$. FIGS. 5(k) and 6(k) illustrate the value of the distance data validity determination signal $S_{A12}$. FIGS. 5(l) and 6(l) illustrate the value of the distance calculation reference signal $D_{A12}$. FIGS. 5(m) and 6(m) illustrate the valid data range. FIGS. 5(n) and 6(n) illustrate the range in which measurement is possible.

In FIG. 5, the incident pulsed light $L_R$ is incident on the photoelectric conversion region 21 during a period from t=+1 to t=+3. That is, the timing of the incident pulsed light $L_R$ is later than the timing of the incident pulsed light $L_R$ illustrated in FIG. 3. In other words, the delay time $T_D$ in FIG. 5 is longer than the delay time $T_D$ in FIG. 3. Therefore, in order to capture the incident pulsed light $L_R$, a timing of the control pulse $G_2$ is set to the period from t=+1 to +2. A timing of the control pulse $G_3$ is set in the period from t=+2 to +3. The distance data validity determination signal $S_{A12}$ and the distance calculation reference signal $D_{A12}$ are obtained by using the detection signals $S_1$ to $S_3$. Content of the calculation is the same as that in the first embodiment. The distance calculation reference signal selection means 37 determines whether or not the value of the distance calculation reference signal $D_{A12}$ is within a predetermined range defined by the threshold values $Th_2$ and $Th_3$. In this embodiment, the threshold value $Th_2$ is 1.01. The threshold value $Th_3$ is 1.99. That is, the predetermined range is 1.01 or more and 1.99 or less. Therefore, the distance calculation reference signal selection means 37 determines whether or not the value of the distance calculation reference signal $D_{A12}$ is 1.01 or more and 1.99 or less ($Th_2 \leq D_{A12} \leq Th_3$). Accordingly, t=1.21 to 2.19 can be obtained as a range in which measurement is possible.

In FIG. 6, the incident pulsed light $L_R$ caused by the object S at a further distance is captured. When a distance between the object S and the distance image sensor 10 becomes large, a time from emission of the pulsed light $L_P$ to incidence of the incident pulsed light $L_R$ on the photoelectric conversion region 21 becomes long. For example, in the example of FIG. 6, the incident pulsed light $L_R$ is incident on the photoelectric conversion region 21 during a period from t=+2 to +4. That is, the timing of the incident pulsed light $L_R$ is later than the timing of the incident pulsed light $L_R$ illustrated in FIGS. 3 and 5. In other words, the delay time $T_D$ in FIG. 6 is longer than the delay time $T_D$ in FIGS. 3 and 5. Therefore, in order to capture the incident pulsed light $L_R$, the timing of the control pulse $G_2$ is set to the period from t=+2 to +3. The timing of the control pulse $G_3$ is set to the period from t=+3 to +4. The distance data validity determination signal $S_{A12}$ and the distance calculation reference signal $D_{A12}$ are obtained by using the detection signals $S_1$ to $S_3$. The distance calculation reference signal selection means 37 determines whether or not the value of the distance calculation reference signal $D_{A12}$ is within a predetermined range defined by the threshold values $Th_2$ and $Th_3$. In this embodiment, the threshold value $Th_2$ is 2.01. The threshold value $Th_3$ is 2.99. The predetermined range is 2.01 or more and 2.99 or less. Therefore, the distance calculation reference signal selection means 37 determines whether or not the value of the distance calculation reference signal $D_{A12}$ is 2.01 or more and 2.99 or less ($Th_2 \leq D_{A12} \leq Th_3$). As a result, t=2.11 to 3.09 can be obtained as a range in which measurement is possible.

Finally, the distance image generation means 38 calculates the distance of the object S on the basis of the distance calculation reference signal $D_{A12}$ when a determination is made that the distance calculation reference signal $D_{A12}$ is in the "valid data range" and a determination is made that the distance calculation reference signal $D_{A12}$ is in the "range in which measurement is possible".

According to the operation of the second embodiment, it is possible to distribute the amount of charge generated by the incident pulsed light $L_R$ to a plurality of time windows. The plurality of time windows correspond to the detection signals $S_2$ and $S_3$ of three types of subframe periods $S_{Z1}$, $S_{Z2}$ and $S_{Z3}$. As a result, it is possible to expand a range in which calculation is possible, which corresponds to the delay time $T_D$. Further, it is possible to reduce a time width of the time window. Further, it is possible to calculate the distance using a value of an appropriate distance data reference signal in correspondence to a range in which the object S is located. Therefore, it is possible to generate a highly accurate image signal regardless of the position of the object S.

According to the operation of the second embodiment, it is possible to detect the charge using a large number of time windows having a small duty ratio. As a result, even when the object S in various distance measurement ranges is a target, an influence of the background light on the detection signals $S_2$ and $S_3$ is reduced by the detection signal $S_1$. As a result, distance calculation with high distance resolution is realized. Further, it is also possible to prevent an error in distance calculation due to saturation of the detection signals $S_2$ and $S_3$ due to strong background light.

Third Embodiment

Figure 7:
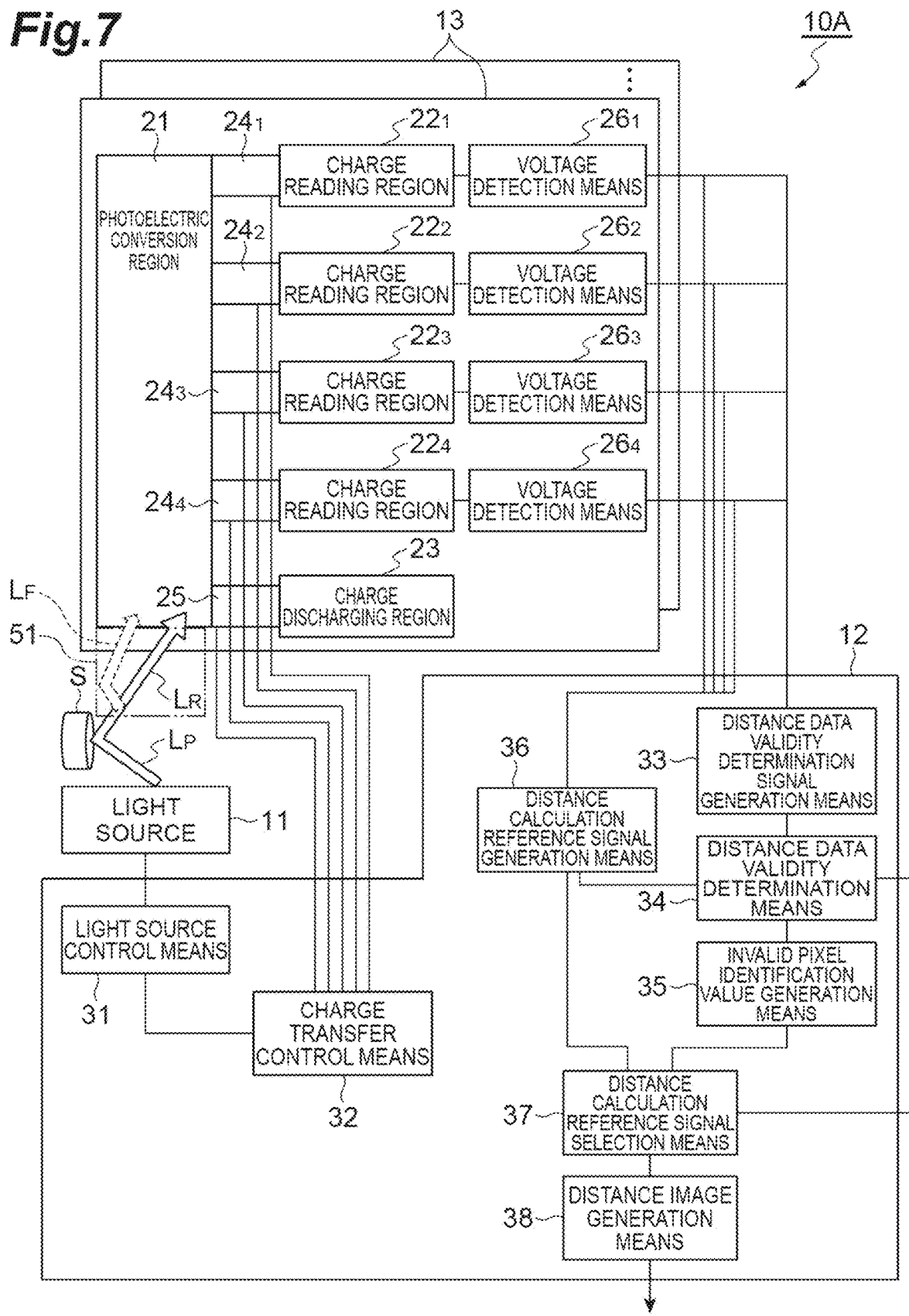
FIG. 7 is a block diagram illustrating a schematic configuration of a distance image sensor according to a third embodiment.

The distance image sensor 10 of the first embodiment adopts a 3-tap, 1-zone, 1-subframe system. A distance image sensor 10A of a third embodiment adopts a 4-tap 2-hour window scheme as yet another scheme. As illustrated in FIG. 7, the distance image sensor 10A includes four charge reading regions $22_1$ to $22_4$, four control electrodes $24_1$ to $24_4$, and four voltage detection means $26_1$ to $26_4$ as a physical configuration. Further, the distance image sensor 10A may use two or more subframes. That is, the distance image sensor 10A employs a multi-tap such as 4 taps or more. Further, the distance image sensor 10A performs processing for each distance range shifted by a combination of taps. The distance image sensor 10A performs distance measurement by synthesizing results obtained for respective distance ranges.

Figure 8:
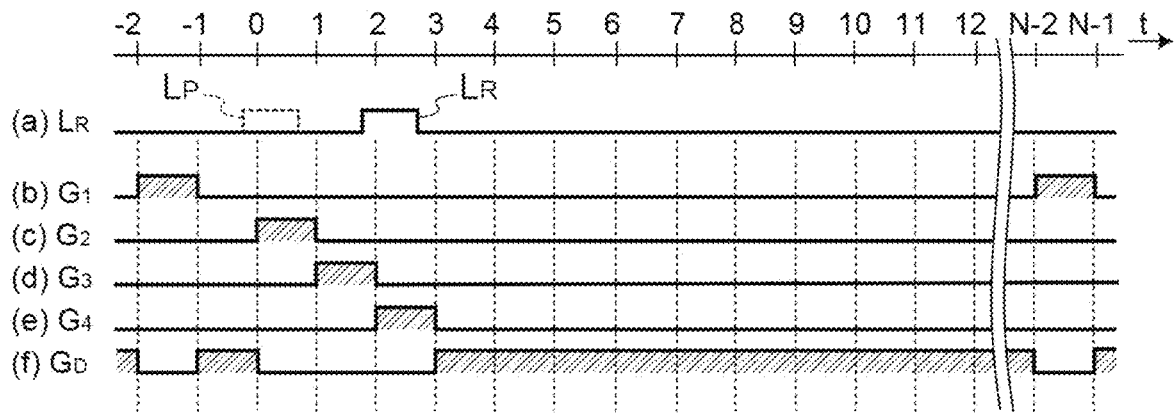
FIG. 8 is a timing chart of various signals handled by the distance image sensor of the third embodiment.
Figure 8:
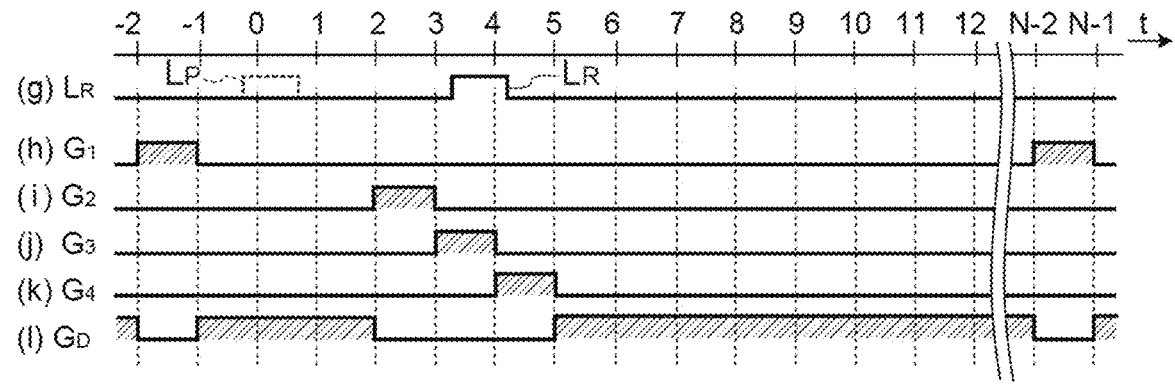
Figure 8:
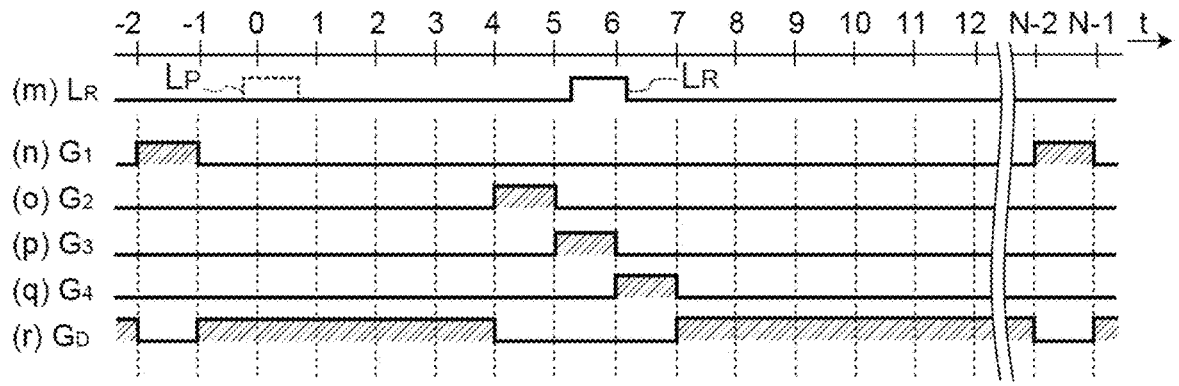

FIG. 8 is a timing chart of various signals handled by the distance image sensor 10A. FIGS. 8(a) to 8(f) illustrate an operation in which a short distance is set as a measurement target range. FIGS. 8(g) to 8(l) illustrate an operation in which a medium distance is set as the measurement target range. FIGS. 8(m) to 8(r) illustrate an operation in which a long distance is set as the measurement target range.

FIG. 8(a) illustrates the timing of the pulsed light $L_P$ and the timing of the incident pulsed light $L_R$ caused by the object S at a short distance. FIGS. 8(b) to 8(f) illustrate timings of the control pulses $G_1$ to $G_4$ and $G_D$. The charge transfer control means 32 outputs the control pulse $G_1$ during the period from t=−2 to −1. Since the charge transfer control means 32 captures the incident pulsed light $L_R$ caused by the object S at a short distance, the control pulse $G_2$ is output in a period from t=0 to +1, the control pulse $G_3$ is output in a period from t=+1 to +2, and the control pulse $G_4$ is output in the period from t=+2 to +3, as illustrated in parts (c) to (e) of FIG. 8. The charge transfer control means 32 outputs the control pulse $G_D$ during a period in which the control pulses $G_1$ to $G_4$ are not output. According to this operation, it is possible to capture the pulsed light $L_R$ incident in t=0 to +3, as illustrated in FIG. 8(a).

FIG. 8(g) illustrates the timing of the pulsed light $L_P$ and the timing of the incident pulsed light $L_R$ caused by the object S at a medium distance. FIGS. 8(h) to 8(l) illustrate the timings of the control pulses $G_1$ to $G_4$ and $G_D$. The charge transfer control means 32 outputs the control pulse $G_1$ during the period from t=−2 to −1. Since the charge transfer control means 32 captures the incident pulsed light $L_R$ caused by the object S at a medium distance, the control pulse $G_2$ is output in a period from t=+2 to +3, the control pulse $G_3$ is output in the period from t=+3 to +4, and the control pulse $G_4$ is output in a period from t=+4 to +5, as illustrated in parts (i) to (k) of FIG. 8. The charge transfer control means 32 outputs the control pulse $G_D$ during the period in which the control pulses $G_1$ to $G_4$ are not output. According to this operation, it is possible to capture the incident pulsed light $L_R$ incident in t=+2 to +5, as illustrated in FIG. 8(g).

FIG. 8(m) illustrates the timing of the pulsed light $L_P$ and a timing at which the incident pulsed light $L_R$ caused by the object S at a long distance is incident. FIGS. 8(n) to 8(r) illustrate the timings at which the control pulses $G_1$ to $G_4$ and $G_D$ are output. The charge transfer control means 32 outputs the control pulse $G_1$ during the period from t=−2 to −1. Since the charge transfer control means 32 captures the incident pulsed light $L_R$ caused by the object S at a long distance, the control pulse $G_2$ is output in the period from t=+4 to +5, the control pulse $G_3$ is output in a period from t=+5 to +6, and the control pulse $G_4$ is output in a period from t=+6 to +7, as illustrated in FIGS. 8(o) to 8(q). The charge transfer control means 32 outputs the control pulse $G_D$ during the period in which the control pulses $G_1$ to $G_4$ are not output. According to this operation, it is possible to capture the incident pulsed light $L_R$ incident in t=+4 to +7, as illustrated in FIG. 8(g).

Figure 9:
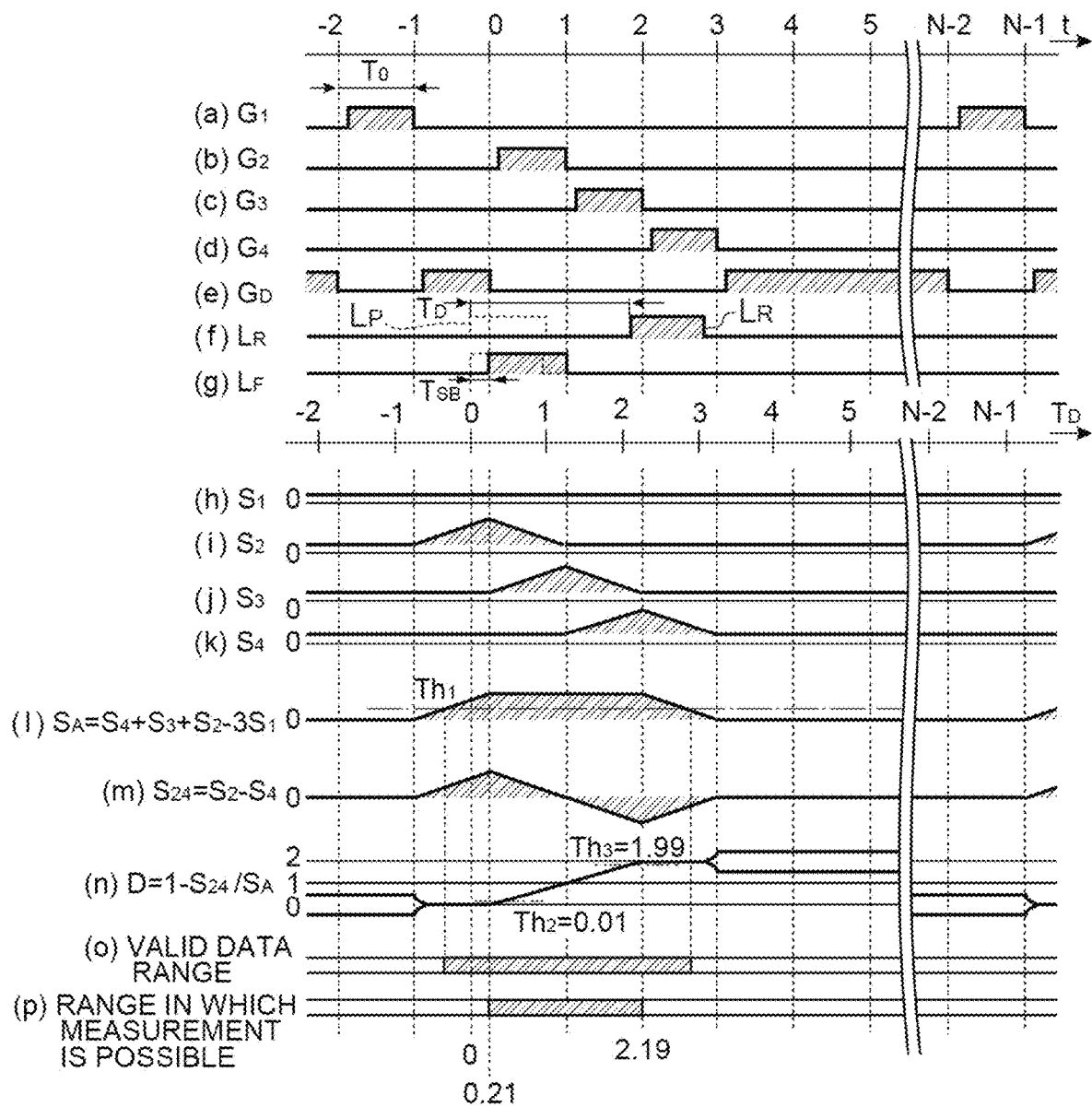
FIG. 9 is a graph illustrating a part of the timing chart of various signals illustrated in FIG. 8 and changes in various values calculated by the distance image sensor with respect to the delay time.

FIG. 9 is a timing chart of various signals handled by the distance image sensor 10A, and a graph illustrating changes in various calculated values with respect to the delay time $T_D$. FIG. 9 illustrates a detailed operation of the short-distance subframe in FIG. FIGS. 9(a) to 9(g) are based on real time(t). FIGS. 9(h) to 9(p) are based on the delay time $T_D$. FIGS. 9(a) to 9(e) illustrate timings at which the control pulses $G_1$ to $G_4$ and $G_D$ are output. FIG. 9(f) illustrates the timing of the pulsed light $L_P$ and the timing of the incident pulsed light $L_R$. FIG. 9(g) illustrates a timing of the stray light $L_F$. FIGS. 9(h) to 9(k) illustrate the values of the detection signals $S_1$ to $S_4$. FIG. 9(l) illustrates the value of the distance data validity determination signal $S_A$. FIG. 9(m) illustrates a difference value $S_{24}$. FIG. 9(n) illustrates a value of the distance calculation reference signal D. FIG. 9(o) illustrates the valid data range. FIG. 9(p) illustrates the range in which measurement is possible.

The distance image sensor 10A starts the process of generating the distance image. The light source control means 31 and the charge transfer control means 32 of the calculation circuit 12 control a timing at which the control pulses $G_1$ to $G_4$ and $G_D$ are output and a timing of the pulsed light $L_P$ within a period of one frame (light source control step and charge transfer control step). Specifically, first, the charge transfer control means 32 sets durations of the control pulses $G_1$ to $G_4$ and $G_D$ to $T_1=T_0$. Then, the charge transfer control means 32 outputs the control pulse $G_1$ in the period from t=−2 to −1. Then, the charge transfer control means 32 outputs the control pulse $G_D$ in the period from t=−1 to 0. Then, the charge transfer control means 32 outputs the control pulse $G_2$ in the period from t=0 to +1. Then, the charge transfer control means 32 outputs the control pulse $G_3$ in the period from t=+1 to +2. Then, the charge transfer control means 32 outputs the control pulse $G_4$ in the period from t=+2 to +3. Then, the charge transfer control means 32 outputs the control pulse $G_D$ in a period after t=+3. Thereafter, the voltage detection means $26_1$ to $26_4$ of each pixel circuit 13 read the detection signals $S_1$ to $S_4$. The detection signals $S_1$ to $S_4$ are output to the calculation circuit 12 (voltage detection step).

Then, the calculation circuit 12 calculates the distance information for each pixel on the basis of the detection signals $S_1$ to $S_4$ output from each pixel circuit 13 (distance calculation step). The calculation for obtaining the distance information includes a step of obtaining the distance data validity determination signal $S_A$, a step of obtaining the difference value $S_{24}$, a step of obtaining the distance calculation reference signal D, a step of determining the valid data range, a step of determining a range in which measurement is possible, and a step of obtaining the distance of the object S.

First, the distance data validity determination signal $S_A$ is obtained. The distance data validity determination signal generation means 33 obtains the distance data validity determination signal $S_A$ using Equation (4) below on the basis of the detection signals $S_1$ to $S_4$.

$$S_A = S_4 + S_3 + S_2 - 3S_1 \qquad (4)$$

Then, the difference value $S_{24}$ is obtained using Equation (5) below.

$$S_{24} = S_2 - S_4 \qquad (5)$$

Then, the distance data validity determination means 34 obtains the valid data range by comparing the value of the distance data validity determination signal $S_A$ with the threshold value $Th_1$. For example, the threshold value $Th_1$ may be 0.5. The distance data validity determination means 34 obtains a range of the distance data validity determination signal $S_A$ having a value larger than the threshold value $Th_1$ as the valid data range. According to FIGS. 9(l) and 9(o), a lower limit of the valid data range is between t=−1 and 0. An upper limit of the valid data range is between t=2 and 3.

Then, the distance calculation reference signal generation means 36 obtains the distance calculation reference signal D on the basis of Equation (6) below.

$$D = 1 - S_{24}/S_A \qquad (6)$$

The distance calculation reference signal selection means 37 determines whether or not the value of the distance calculation reference signal D is within a predetermined range defined by the threshold values $Th_2$ and $Th_3$. In this embodiment, the threshold value $Th_2$ is 0.01. The threshold value $Th_3$ is 1.99. The predetermined range is 0.01 or more and 1.99 or less. Therefore, the distance calculation reference signal selection means 37 determines whether or not the value of the distance calculation reference signal D is 0.01 or more and 1.99 or less ($Th_2 \leq D \leq Th_3$). Accordingly, t=0.21 to 2.19 can be obtained as a range in which measurement is possible.

In the distance image sensor 10A, a timing at which the control pulse $G_1$ is output is also set before the timing of the pulsed light $L_P$, as in the distance image sensor 10. As a result, the distance image sensor 10A can curb an influence of flare.

Fourth Embodiment

Figure 10:
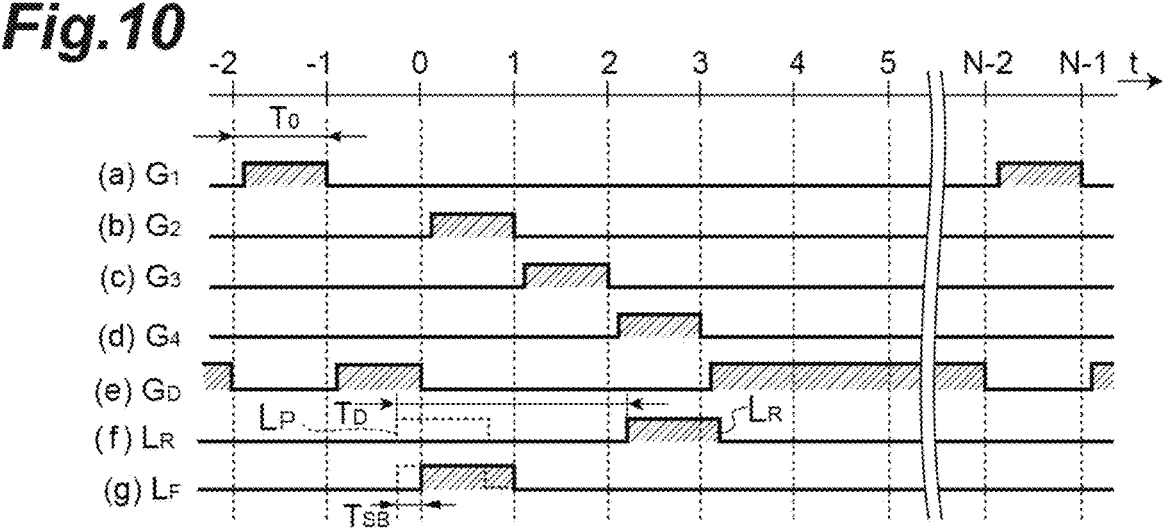
FIG. 10 is a timing chart of various signals handled by a distance image sensor of a fourth embodiment.
Figure 10:
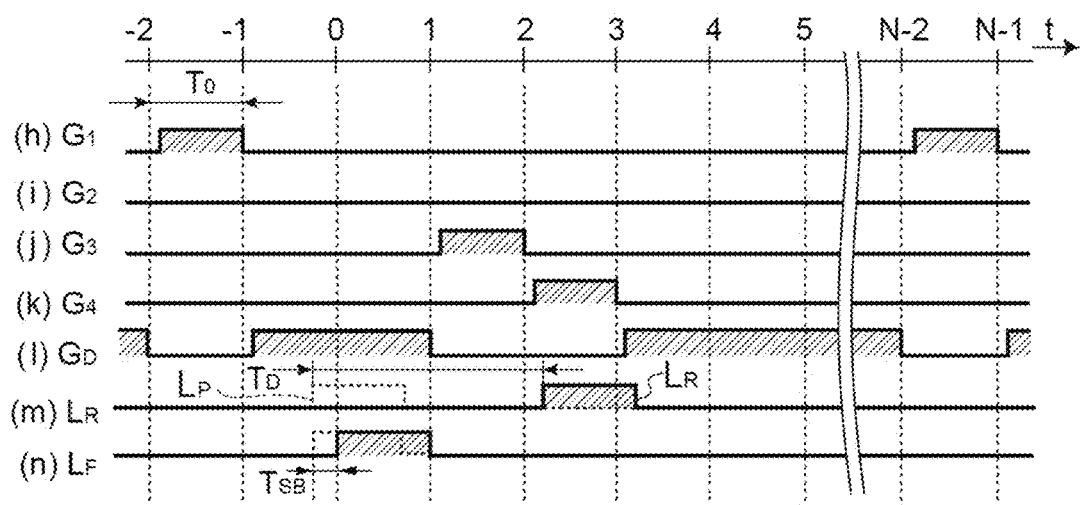
Figure 10:
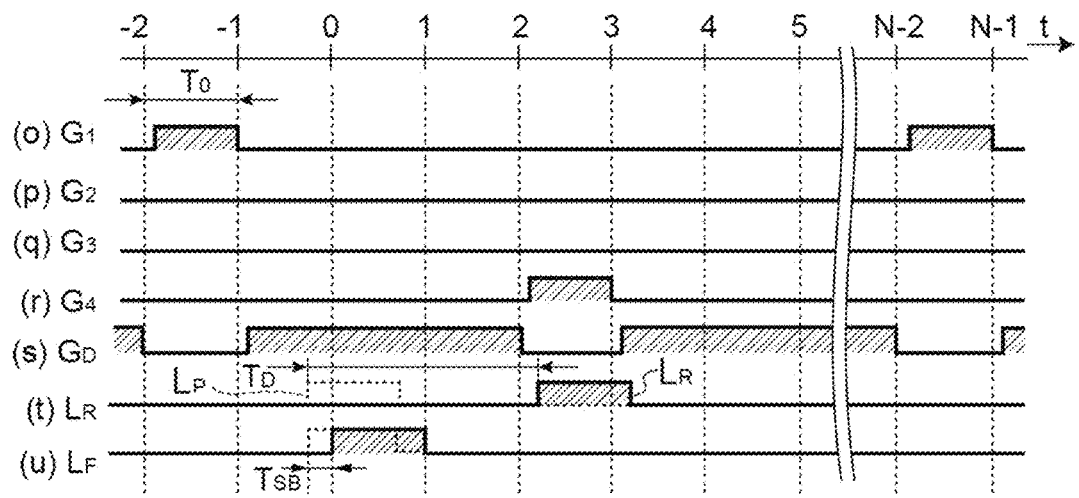

A distance image sensor 10A of a fourth embodiment adopts a 4-tap 2-hour window scheme, like the distance image sensor 10A of the third embodiment. The distance image sensor 10A of the third embodiment always provides control pulses $G_2$ to $G_4$ for measuring the distance. However, the control pulses $G_2$ to $G_4$ do not necessarily have to be provided all the time. For example, when the operation illustrated in FIG. 8 is repeatedly executed, a part of the control pulses $G_2$ to $G_4$ may be omitted in some operations. An operation of omitting the control pulses $G_2$ to $G_4$ in this way is referred to as a "thinning operation". Hereinafter, details of the thinning operation performed by the distance image sensor 10A of the fourth embodiment will be described with reference to FIGS. 10 and 11.

FIGS. 10(a) to 10(g) illustrate a control timing of a pattern P1. FIGS. 10(h) to 10(n) illustrate a control timing of a pattern P2. FIGS. 10(o) to 10(u) illustrate a control timing of a pattern P3. FIGS. 10(a) to 10(e), 10(h) to 10(l), and 10(o) to 10(s) illustrate timings of the control pulses $G_1$ to $G_4$ and $G_D$. FIGS. 10(f), 10(m), and 10(t) illustrate timing of the pulsed light $L_P$ and the timing of the incident pulsed light $L_R$. FIGS. 10(g), 10(n) and 10(u) illustrate a timing of stray light $L_F$.

As illustrated in FIGS. 10(a) to 10(d), the charge transfer control means 32 outputs all the control pulses $G_1$ to $G_4$ as the pattern P1. On the other hand, as illustrated in FIGS. 10(h) to 10(k), the charge transfer control means 32 outputs the control pulses $G_1$, $G_3$, and $G_4$ as the pattern P2. The charge transfer control means 32 does not output the control pulse $G_2$ in the pattern P2. The charge transfer control means 32 outputs the control pulse $G_D$ during a period (t=0 to +1) in which the control pulse $G_2$ is output. As illustrated in FIGS. 10(o) to 10(r), the charge transfer control means 32 outputs the control pulses $G_1$ and $G_4$ as the pattern P3. The charge transfer control means 32 does not output the control pulses $G_2$ and $G_3$ in the pattern P3. The charge transfer control means 32 outputs the control pulse $G_D$ during the period (t=0 to +1) in which the control pulse $G_2$ is output. Further, the charge transfer control means 32 outputs the control pulse $G_D$ even during the period (t=+1 to +2) in which the control pulse $G_3$ is output.

Figure 11A:
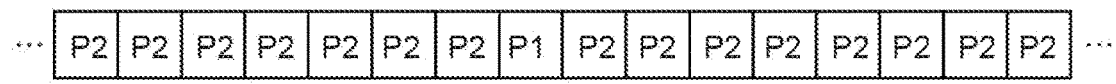
FIGS. 11(a) and 11(b) are diagrams illustrating an operation of the distance image sensor of the fourth embodiment.

For example, as illustrated in FIG. 11(a), the distance image sensor 10A may perform an operation including the pattern P1 and the pattern P2. In the example illustrated in FIG. 11(a), one of eight patterns is the pattern P1, and the remaining seven patterns are the pattern P2. In this case, the distance calculation reference signal generation means 36 obtains distance calculation reference signals $D_1$ and $D_2$ on the basis of Equations (7) and (8) below.

$$D_1 = (S_3 - S_1)/(S_3 + 8S_2 - 2S_1) \qquad (7)$$

$$D_2 = (S_4 - S_1)/(S_4 + S_3 - 2S_1) \qquad (8)$$

Figure 11B:
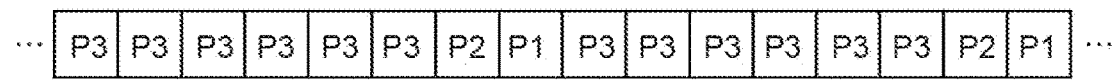

As another example, the distance image sensor 10A may perform an operation including the pattern P1, the pattern P2, and the pattern P3, as illustrated in FIG. 11(b). In the example illustrated in FIG. 11(b), one of the eight patterns is the pattern P1, one pattern is the pattern P2, and the remaining six patterns are the pattern P3. In this case, the distance calculation reference signal generation means 36 obtains the distance calculation reference signals $D_1$ and $D_2$ on the basis of Equations (9) and (10) below.

$$D_1 = (4S_3 - S_1)/(4S_3 + 8S_2 - 2S_1) \qquad (9)$$

$$D_2 = (S_4 - S_1)/(S_4 + 4S_3 - 2S_1) \qquad (10)$$

According to an operation of the fourth embodiment, saturation of the detection signals $S_1$ to $S_4$ can be prevented when the object S in a short distance measurement range is a target. As a result, it is possible to improve a dynamic range of distance measurement.

More specifically, according to the operation of the fourth embodiment, saturation of the detection signals $S_1$ to $S_4$ can be prevented when the object S in the short distance measurement range is a target. As a result, it is possible to improve a dynamic range of distance measurement. That is, since the number of electrons generated due to strong incident pulsed light $L_R$ increases when the object S in a short distance region is a target, the number of electrons is likely to exceed the number of saturated electrons in the pixel circuit 13. In the operation of the fourth embodiment, the number of times the charge is captured according to the time window is reduced in a subframe period in which a time window for measurement in the short distance region has been set. Therefore, the number of generated electrons is curbed. As a result, the number of electrons generated in the pixel circuit 13 can be kept within a range of the number of saturated electrons. Therefore, it is possible to sufficiently improve distance resolution when the object S in a long distance region is a target. Further, the distance resolution when the object S in the short distance region is a target can also be maintained at a sufficient value.

Fifth Embodiment

A distance image sensor 10A of a fifth embodiment adopts a 4-tap 4-hour window scheme. A physical configuration of the distance image sensor 10A is the same as that of the distance image sensor 10A of the third embodiment. Further, the distance image sensor 10A of the fifth embodiment may also use two or more subframes.

The distance image sensor 10A of the fifth embodiment differs from the distance image sensor 10A of the third embodiment in the aspect of the control pulse $G_1$. For example, in the third embodiment, the control pulse $G_1$ is always output in the period from t=−2 to −1. That is, the timing of the control pulse $G_1$ was one.

Figure 12:
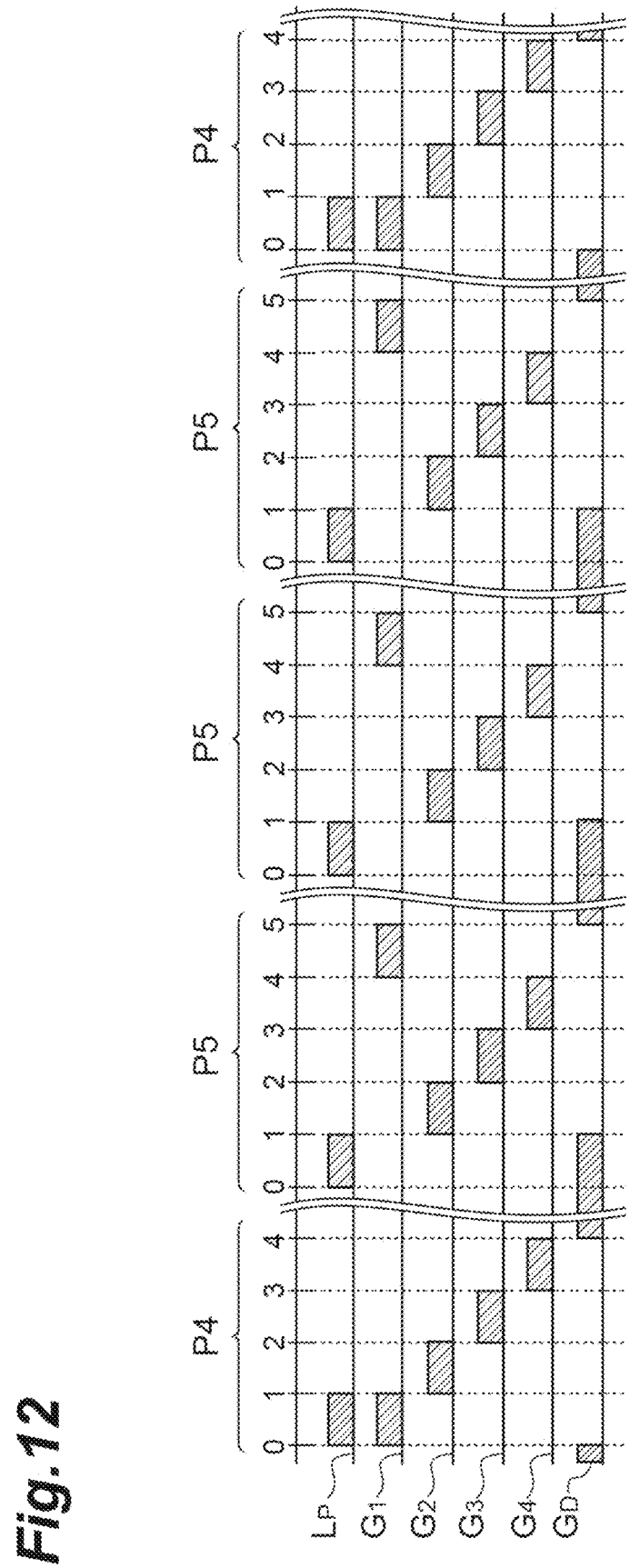
FIG. 12 is a timing chart of various signals handled by the distance image sensor of a fifth embodiment.

On the other hand, as illustrated in FIG. 12, in the fifth embodiment, the timing of the control pulse $G_1$ includes two patterns P4 and P5. Specifically, the control pulse $G_1$ is output in the period from t=0 to +1 (pattern P4: fourth operation). Further, the control pulse $G_1$ is output during the period from t=+4 to +5 (pattern P5: third operation). In an operation of the fifth embodiment, the patterns P4 and P5 are selectively executed. A timing at which the control pulse $G_1$ is output is determined by a predetermined output ratio. Now, a variable K is adopted as a value indicating the output ratio. The variable K indicates the number of patterns.

For example, a proportion at which the control pulse $G_1$ is output during a period from t=0 to +1 is 1/K, as in the pattern P4. That is, when the variable K is 8, the control pulse $G_1$ is output only once in eight times during the period from t=0 to +1. On the other hand, a proportion at which the control pulse $G_1$ is output during a period from t=+4 to +5 is 1−1/K as in the pattern P5. That is, when the variable K is 8, the control pulse $G_1$ is output only seven times in eight times during the period from t=+4 to +5. Therefore, as described above, in the fifth embodiment, the control pulse $G_1$ is not output during both of the period from t=0 to +1 and the period from t=+4 to +5 in one pattern. This operation aspect can be said to be an operation in which a sum of a proportion (1/K) at which the control pulse $G_1$ is output during the period from t=0 to +1 and a proportion (1−1/K) at which the control pulse $G_1$ is output during the period from t=+4 to +5 becomes 1.

Figure 13:
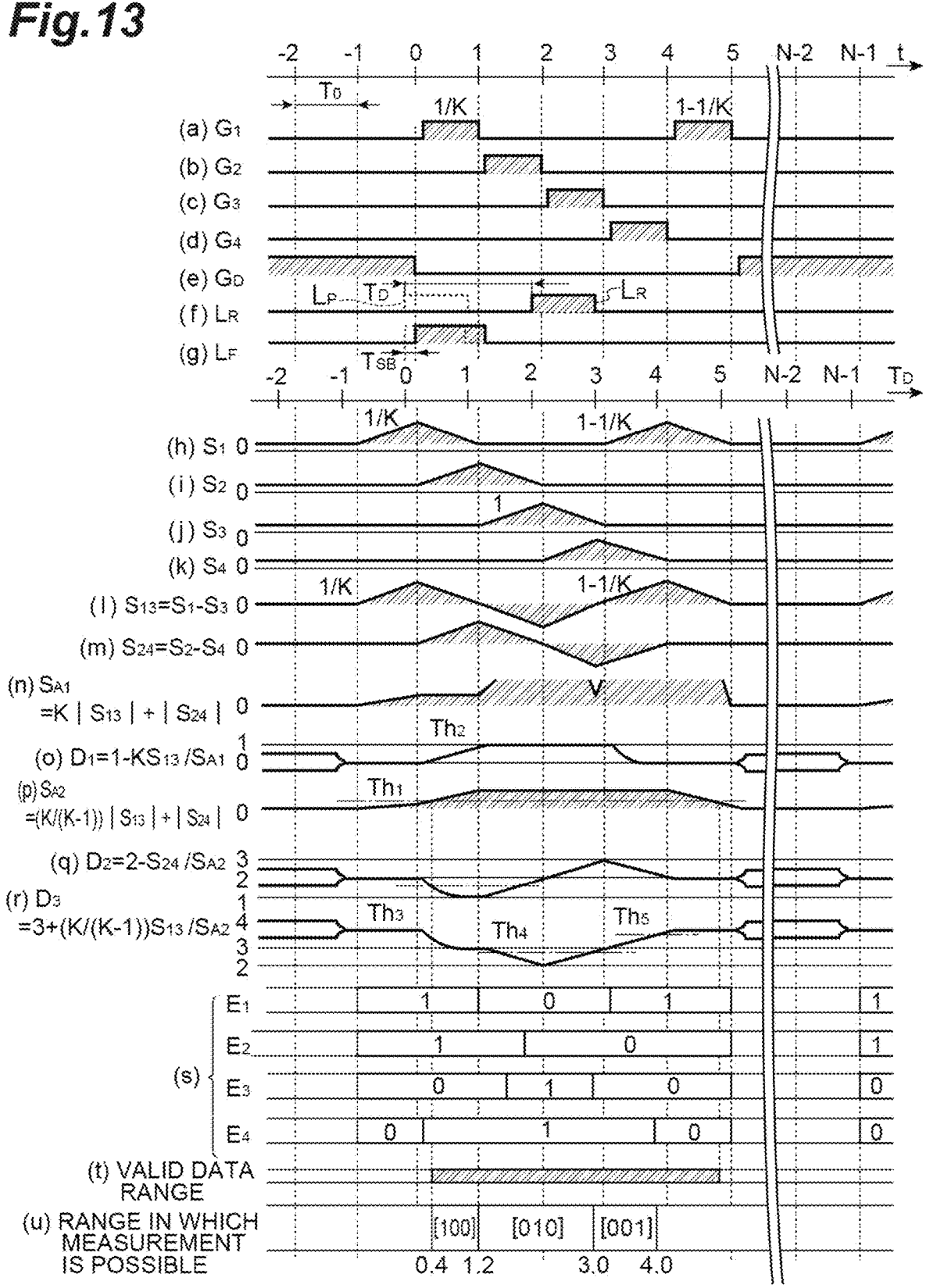
FIG. 13 is a graph illustrating a part of the timing chart of the various signals handled by the distance image sensor of the fifth embodiment and changes in various values calculated by the distance image sensor with respect to the delay time.

FIG. 13 is a timing chart of various signals handled by the distance image sensor 10A, and a graph illustrating changes in the calculated values with respect to the delay time $T_D$. FIGS. 13(a) to 13(g) are based on real time(t). FIGS. 13(h) to 13(u) are based on the delay time $T_D$. FIGS. 13(a) to 13(e) illustrate timings at which the control pulses $G_1$ to $G_4$ and $G_D$ are output. FIG. 13(f) illustrates a timing of the pulsed light $L_P$ and a timing of the incident pulsed light $L_R$. FIG. 13(g) illustrates a timing of stray light $L_F$. FIGS. 13(h) to 13(k) illustrate values of the detection signals $S_1$ to $S_4$. FIGS. 13(l) and 13(m) illustrate difference values $S_{13}$ and $S_{24}$. FIGS. 13(n) and 13(o) illustrate a value of the distance data validity determination signal $S_{A1}$ and a value of a distance calculation reference signal $D_1$. FIGS. 13(p) and 13(q) illustrate a value of a distance data validity determination signal $S_{A2}$ and a value of a distance calculation reference signal $D_2$. FIG. 13(r) illustrates a value of a distance calculation reference signal $D_3$. FIG. 13(s) illustrates values of comparison signals $E_1$ to $E_4$. FIG. 13(t) illustrates the valid data range. FIG. 13(u) illustrates the range in which measurement is possible.

The distance image sensor 10A starts the process of generating the distance image. The light source control means 31 and the charge transfer control means 32 of the calculation circuit 12 control a timing at which the control pulses $G_1$ to $G_4$ and $G_D$ are output and a timing of the pulsed light $L_P$ within a period of one frame (light source control step and charge transfer control step). Specifically, first, the charge transfer control means 32 sets durations of the control pulses $G_1$ to $G_4$ and $G_D$ to $T_1=T_0$. Then, the charge transfer control means 32 outputs the control pulse $G_1$ in either the period from t=0 to +1 or the period from t=+4 to +5. Then, the charge transfer control means 32 outputs the control pulse $G_2$ in the period from t=+1 to +2. Then, the charge transfer control means 32 outputs the control pulse $G_3$ in the period from t=+2 to +3. Then, the charge transfer control means 32 outputs the control pulse $G_4$ in the period from t=+3 to +4. The charge transfer control means 32 outputs the control pulse $G_D$ in a period after t=+5. Further, the charge transfer control means 32 outputs the control pulse $G_D$ during the period in which the control pulses $G_1$ to $G_4$ are not output. Thereafter, the voltage detection means $26_1$ to $26_4$ of each pixel circuit 13 read the detection signals $S_1$ to $S_4$. The read detection signals $S_1$ to $S_4$ are output to the calculation circuit 12 (voltage detection step).

Then, the calculation circuit 12 calculates the distance information for each pixel on the basis of the detection signals $S_1$ to $S_4$ output from each pixel circuit 13 (distance calculation step). The calculation for obtaining the distance information includes a step of obtaining the distance data validity determination signals $S_{A1}$ and $S_{A2}$, a step of obtaining the distance calculation reference signals $D_1$, $D_2$, and $D_3$, a step of selecting any one of the distance calculation reference signals $D_1$, $D_2$, and $D_3$, and a step of obtaining the distance of the object S on the basis of the selected distance calculation reference signal.

First, the distance data validity determination signals Sa1 and $S_{A2}$ are obtained. That is, the distance data validity determination signal generation means 33 obtains the distance data validity determination signals $S_{A1}$ and $S_{A2}$ using Equations (11) to (14) below on the basis of the detection signals $S_1$ to $S_4$.

$$S_{13}=S_1-S_3 \quad (11)$$

$$S_{24}=S_2-S_4 \quad (12)$$

$$S_{A1}=K|S_{13}|+|S_{24}| \quad (13)$$

$$S_{A2}=(K/(K-1))|S_{13}|+|S_{24}| \quad (14)$$

Then, the distance data validity determination means 34 obtains a valid data range by comparing the value of the distance data validity determination signal $S_{A2}$ with the threshold value $Th_1$. For example, the threshold value $Th_1$ is set to about 0.

As a result, intersections between the distance data validity determination signal $S_{A2}$ and the threshold value $Th_1$ are obtained as the upper limit and the lower limit of the valid data range. That is, a range illustrated in FIG. 13(t) is determined to be the "valid data range".

Then, the distance calculation reference signal generation means 36 obtains the distance calculation reference signals $D_1$, $D_2$, and $D_3$ on the basis of Equations (15) to (17) below.

$$D_1=1-KS_{13}/S_{A1} \quad (15)$$

$$D_2=2-S_{24}/S_{A2} \quad (16)$$

$$D_3=3+(K/(K-1))S_{13}/S_{A2} \quad (17)$$

Then, the distance calculation reference signal selection means 37 selects any one of the distance calculation reference signals $D_1$, $D_2$, and $D_3$ as a value to be referred to for distance calculation. First, the distance calculation reference signal selection means 37 obtains the comparison signals $E_1$ to $E_4$ by using Equations (18) to (21).

[Math. 1]

$$E_1 = \begin{cases} 1 & D_1 < 1.0 \\ 0 & D_1 \geq 1.0 \end{cases} \quad (18)$$

[Math. 2]

$$E_2 = \begin{cases} 1 & D_2 < 1.6 \\ 0 & D_2 \geq 1.6 \end{cases} \quad (19)$$

[Math. 3]

$$E_3 = \begin{cases} 1 & D_3 < 2.8 \\ 0 & D_3 \geq 2.8 \end{cases} \quad (20)$$

[Math. 4]

$$E_4 = \begin{cases} 1 & D_3 < 3.8 \\ 0 & D_3 \geq 3.8 \end{cases} \quad (21)$$

Next, the distance calculation reference signal selection means 37 selects any one of the distance calculation reference signals $D_1$, $D_2$, and $D_3$ using the comparison signals $E_1$ to $E_4$ and a determination equation illustrated in Equation (22).

[Math. 5]

$$[E_1 \cdot E_2 \; \overline{E_3} \cdot E_2 \cdot \overline{E_1} + E_3 \; \overline{E_2} \cdot \overline{E_3} \cdot E_4] \quad (22)$$

In Equation (22), when a determination result is [100], the distance calculation reference signal selection means 37 selects the distance calculation reference signal $D_1$. When the determination result is [010], the distance calculation reference signal selection means 37 selects the distance calculation reference signal $D_2$. When the determination result is [001], the distance calculation reference signal selection means 37 selects the distance calculation reference signal $D_3$.

The distance image generation means 38 calculates the distance of the object S on the basis of any one of the distance calculation reference signals $D_1$, $D_2$, and $D_3$ determined to be in the selected "valid data range" and selected on the basis of Equation (22).

As described in the first embodiment, the stray light $L_F$ may be generated by the lens or the housing 51. These objects are located close to the light source 11 and the distance image sensor 10. Therefore, the stray light $L_F$ is highly likely to be incident on the photoelectric conversion region 21 immediately after the pulsed light $L_P$ is emitted from the light source 11. Therefore, in the operation of the fifth embodiment, a frequency at which the control pulse $G_1$ is output is decreased during a period (t=0 to +1) in which the stray light $L_F$ is highly likely to be incident. In the operation of the fifth embodiment, a frequency at which the control pulse $G_1$ is output after the control pulse $G_4$ (t=+4 to +5) is increased. In a period after the control pulse $G_4$ (t=+4 to +5), a sufficient time has passed from the emission of the pulsed light $L_P$, so that the intensity of the stray light $L_F$ is sufficiently attenuated. Therefore, an influence of the stray light $L_F$ on the detection signal $S_1$ obtained in the period after the control pulse $G_4$ (t=+4 to +5) is curbed. As a result, since a proportion of the detection signal $S_1$ on which the influence of the stray light $L_F$ has been curbed increases, it is possible to curb the influence of the stray light $L_F$ on a calculation result.

In short, the operation of the fifth embodiment prevents charge saturation by reducing the number of control pulses $G_1$ output at a timing corresponding to a short distance. Further, in the operation of the fifth embodiment, a component of background light is obtained by the control pulse $G_1$ that is output at a timing corresponding to a long distance. As a result, it is possible to make a flare component included in the detection signal relatively small with respect to the component of the background light.

Sixth Embodiment

An operation in which patterns having different timings at which the control pulse $G_1$ is output are combined as in the fifth embodiment can be made in another aspect. In the first place, in the pattern P5, the timing of the control pulse $G_1$ is set at a time (t=+4 to +5) away from the timing at which the pulsed light $L_P$ is generated in order to curb the influence of the stray light $L_F$. As described in the second embodiment or the like, when the measurement range is a medium distance and a long distance, a timing at which the control pulses $G_1$ to $G_4$ are output is delayed from a timing at which the pulsed light $L_P$ is generated. That is, when the measurement target is a medium distance and a long distance, the influence of the stray light $L_F$ on the detection signal $S_1$ is relatively smaller even when the control pulses $G_1$ to $G_4$ are output in this order.

Figure 14:
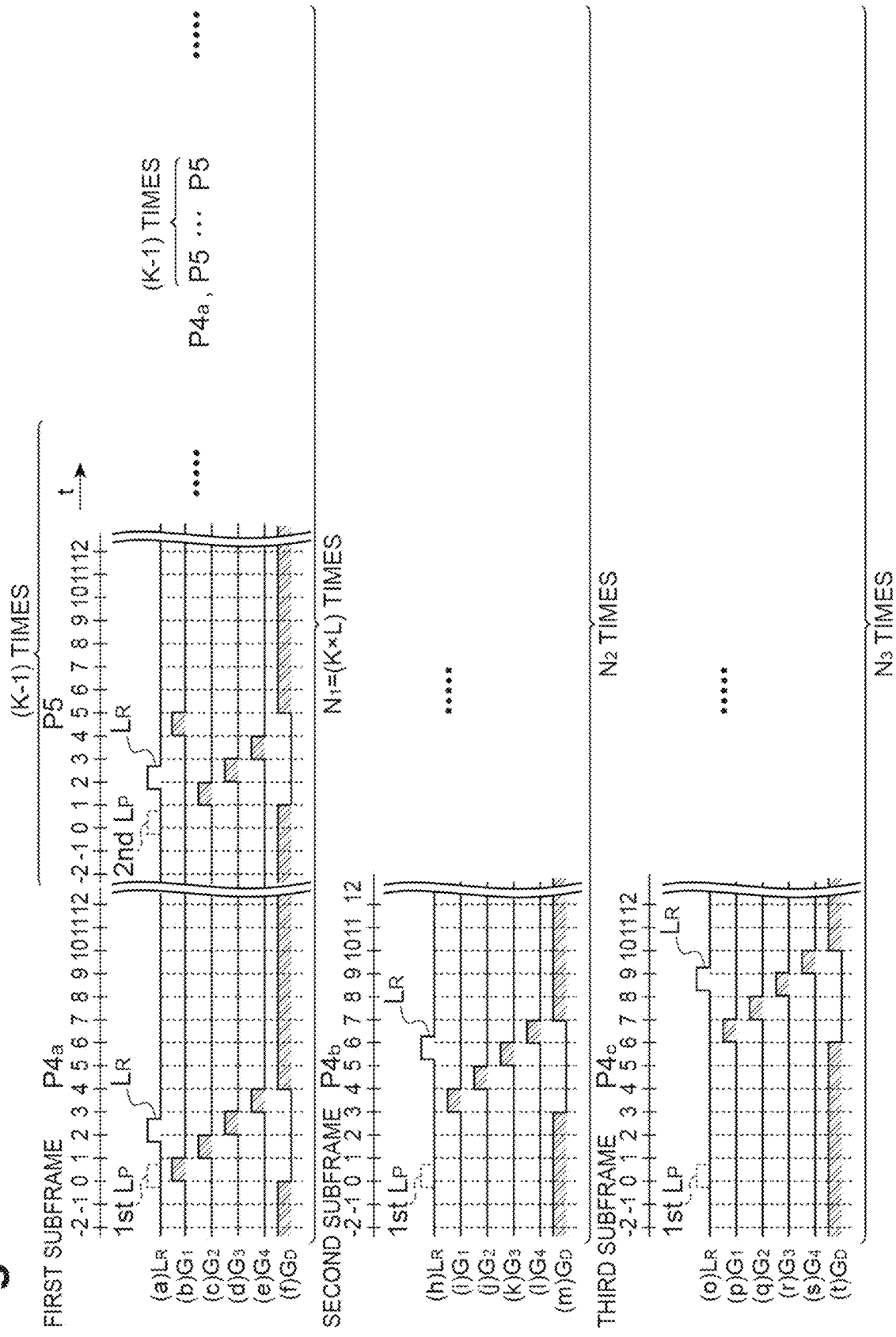
FIG. 14 is a timing chart of various signals handled by a distance image sensor of a sixth embodiment.

FIG. 14 illustrates an operation of the distance image sensor of the sixth embodiment. FIGS. 14(a) to 14(f) illustrate an operation of the first subframe. FIGS. 14(h) to 14(m) illustrate an operation of the second subframe. FIGS. 14(o) to 14(t) illustrate an operation of the third subframe. Further, "L" illustrated in FIG. 14 is an integer. $N_1$, $N_2$, and $N_3$ are the number of repetitions of the pulsed light $L_P$ in the subframe, respectively.

The operation of the first subframe includes two types of operation patterns including patterns P4$_a$ and P5. For example, when two types of operation patterns are repeated with K times of the pulsed light $L_P$ as one cycle, the pattern P4$_a$ is performed once and the pattern P5 is performed (K−1) times. The pattern P4$_a$ is output during a period in which the control pulse $G_1$ is t=0 to +1. According to the operation of the pattern P4$_a$, a result obtained by the control pulse $G_1$ can be used as information for correcting background light and measuring a distance. However, since the period from t=0 to +1 overlaps a period in which irradiation with the pulsed light $L_P$ is performed, a result obtained by the control pulse $G_1$ may also include a component of the stray light $L_F$. On the other hand, in the pattern P5, the control pulse $G_1$ is output during the period from t=+4 to +5. This period is after the control pulses $G_2$ to $G_4$ are output. That is, the stray light $L_F$ is sufficiently attenuated because the period is sufficiently separated from the timing at which irradiation with the pulsed light $L_P$ is performed. Therefore, according to the operation of the pattern P$_5$, it is possible to obtain information with which the background light can be accurately corrected. Further, according to the operation of the first subframe, it is possible to capture the incident pulsed light $L_R$ input in a period from t=0 to +4.

The operation of the second subframe includes only a pattern P4$_b$. The control pulse $G_1$ is output in the period from t=+3 to +4. The control pulse $G_2$ is output in the period from t=+4 to +5. The control pulse $G_3$ is output in the period from t=+5 to +6. The control pulse $G_4$ is output in the period from t=+6 to +7. The control pulse $G_D$ is output during the period in which the control pulses $G_1$ to $G_4$ are not output. According to the operation of the second subframe, it is possible to capture the incident pulsed light $L_R$ input in a period from t=+3 to +7.

The operation of the third subframe includes only a pattern P4$_c$. The control pulse $G_1$ is output in the period from t=+6 to +7. The control pulse $G_2$ is output in the period from t=+7 to +8. The control pulse $G_3$ is output in the period from t=+8 to +9. The control pulse $G_4$ is output in the period from t=+9 to +10. The control pulse $G_D$ is output during the period in which the control pulses $G_1$ to $G_4$ are not output. According to the operation of the second subframe, it is possible to capture the incident pulsed light $L_R$ input in a period from t=+6 to +10.

That is, in a case in which the measurement range is a short distance, when two types of operation patterns are repeated with K times of the pulsed light $L_P$ as one cycle, the pattern P4$a$ may be set for one time and the patterns P5 may be set for the remaining (K−1) times. When the measurement range is a medium distance, the pattern P4$b$ is repeated. When a long distance is set as the measurement range, the pattern P4$b$ is repeated.

Seventh Embodiment

An operation of a distance image sensor 10A of a seventh embodiment will be described with reference to FIGS. 15 and 16. For the operation of the distance image sensor 10A, when a proportion at which the control pulse $G_1$ is output during the period from t=0 to +1 and a proportion at which the control pulse $G_1$ is output during the period from t=+4 to +5 are added, it is also possible to adopt an operation in which a resultant proportion does not become 1.

Figure 15:
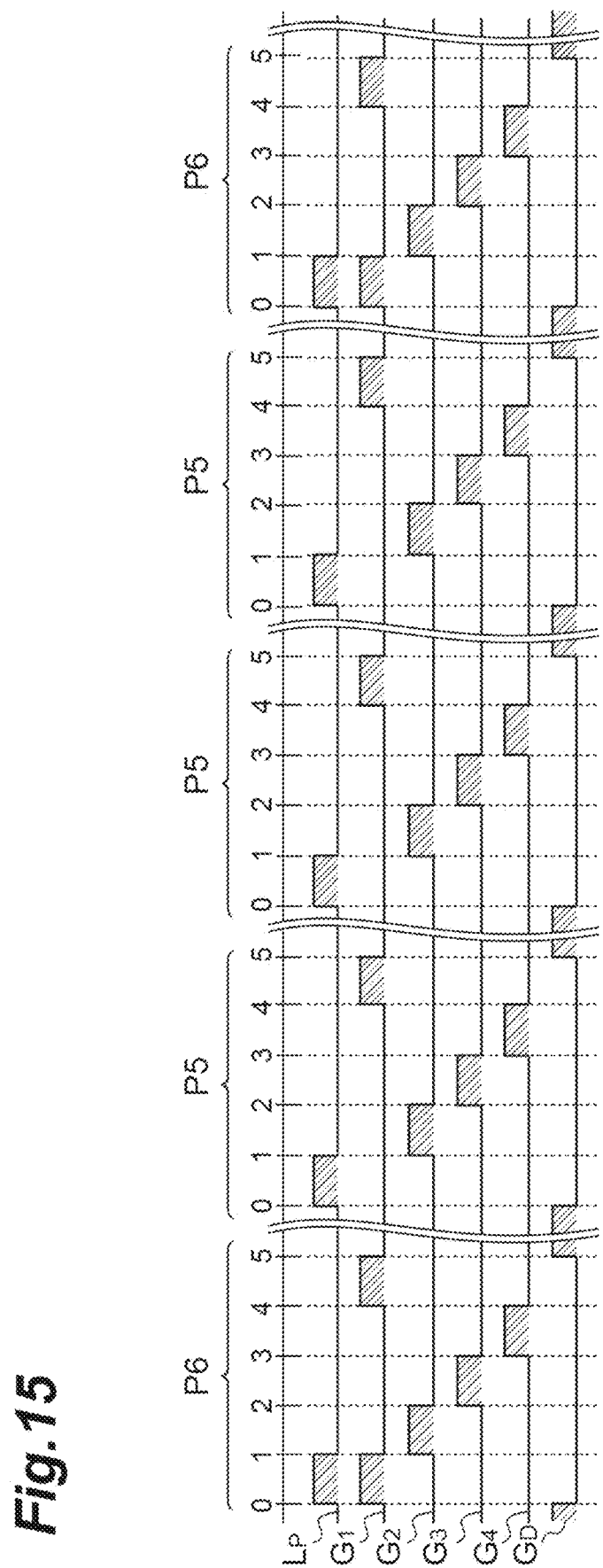
FIG. 15 is a timing chart of various signals handled by a distance image sensor of a seventh embodiment.

Specifically, an operation of the seventh embodiment includes a case in which the control pulse $G_1$ is output only in the period from t=+4 to +5 (pattern P5: first operation), and a case in which the control pulse $G_1$ is output in both of the period from t=0 to +1 and the period from t=+4 to +5 (pattern P6: second operation), as illustrated in FIG. 15. The period from t=0 to +1 is the same time as and after the timing at which the pulsed light $L_P$ is generated and before the control pulses $G_2$ to $G_4$ are output. According to the patterns P5 and P6, the control pulse $G_1$ is always output in the period from t=+4 to +5. In other words, the proportion at which the control pulse $G_1$ is output during the period from t=+4 to +5 is 1. On the other hand, a proportion at which the control pulse $G_1$ is output during the period from t=0 to +1 is 1/K. Therefore, in the operation of the seventh embodiment, a sum of a proportion (1/K) at which the control pulse $G_1$ is output during the period from t=0 to +1 and a proportion (1) at which the control pulse $G_1$ is output during the period from t=+4 to +5 is 1+1/K, which is not 1.

Figure 16:
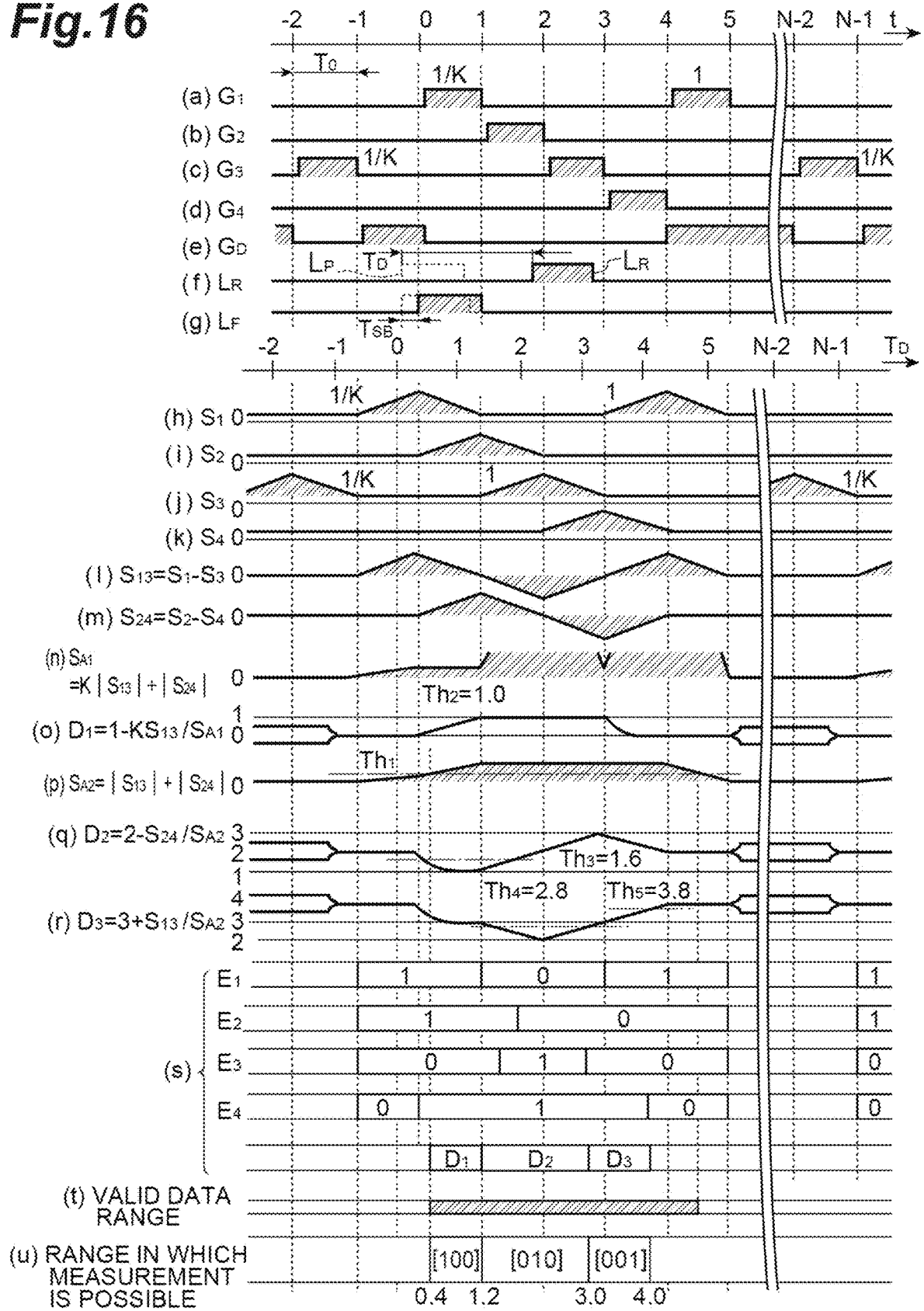
FIG. 16 is a graph illustrating a part of the timing chart of the various signals handled by the distance image sensor of the seventh embodiment and changes in various values calculated by the distance image sensor with respect to the delay time.

As illustrated in FIG. 16, the operation of the seventh embodiment differs from the operation of the sixth embodiment in the equations used for calculation of the distance calculation reference signals $D_1$, $D_2$, and $D_3$ and the distance data validity determination signals $S_{A1}$ and $S_{A2}$. Other operations of the seventh embodiment are the same as those of the sixth embodiment. In the seventh embodiment, the distance calculation reference signals $D_1$, $D_2$, and $D_3$ are generated using Equations (23) to (27) below.

$$S_{A1}=K|S_{13}|+|S_{24}| \quad (23)$$

$$S_{A2}=|S_{13}|+|S_{24}| \quad (24)$$

$$D_1=1-KS_{13}/S_{A1} \quad (25)$$

$$D_2=2-S_{24}/S_{A2} \quad (26)$$

$$D_3=3+S_{13}/S_{A2} \quad (27)$$

According to the operation of the seventh embodiment, a frequency at which the detection signal $S_1$ is obtained is further increased during the period (t=+4 to +5) in which the influence of the stray light $L_F$ is small. As a result, since the number of detection signals $S_1$ that can be used for distance calculation increases, it is possible to further improve the accuracy of the distance measurement.

Eighth Embodiment

The distance image sensor 10A of the third embodiment has adopted a 4-tap 2-hour window scheme. For example, a distance image sensor of an eighth embodiment may adopt a 5-tap 3-hour window scheme. The distance image sensor of the eighth embodiment includes five charge reading regions, five control electrodes, and five voltage detection means as a physical configuration.

Figure 17:
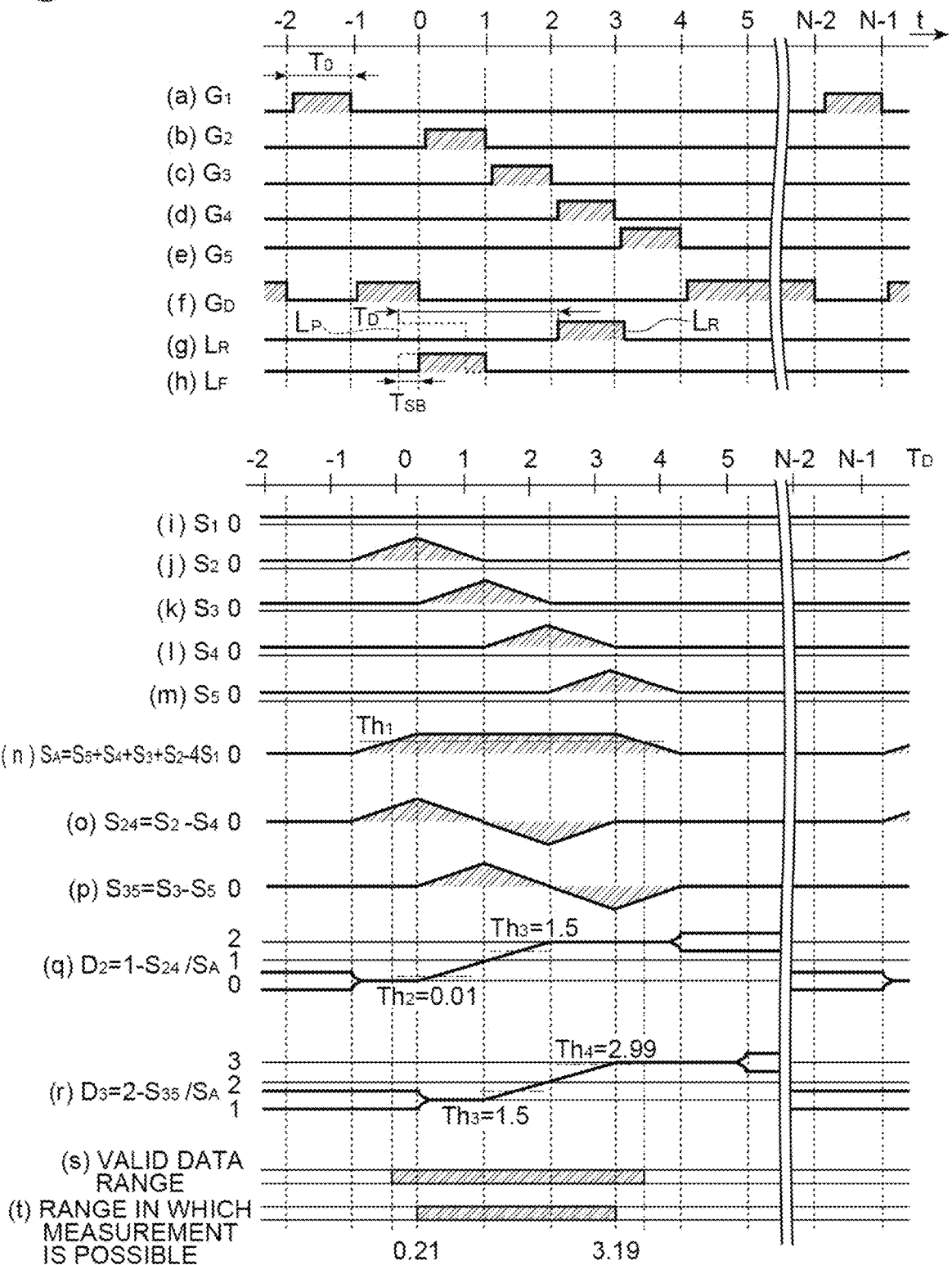
FIG. 17 is a timing chart of various signals handled by the distance image sensor of an eighth embodiment, and a graph illustrating changes in various values calculated by the distance image sensor with respect to a delay time.

FIG. 17 is a timing chart of various signals handled by the distance image sensor of the eighth embodiment, and a graph illustrating changes in various calculated values with respect to the delay time $T_D$. FIGS. 17(a) to 17(h) are based on real time(t). FIGS. 17(i) to 17(t) are based on the delay time $T_D$. FIGS. 17(a) to 17(f) illustrate timings at which control pulses $G_1$ to $G_5$ and $G_D$ are output. FIG. 17(g) illustrates the timing of the pulsed light $L_P$ and the timing of the incident pulsed light $L_R$. FIG. 17(h) illustrates a timing of the stray light $L_F$. FIGS. 17(i) to 17(m) illustrate values of the detection signals $S_1$ to $S_5$. FIG. 17(n) illustrates the value of the distance data validity determination signal $S_A$. FIG. 17(o) illustrates a value of the difference value $S_{24}$. FIG. 17(p) illustrates the value of the difference value $S_{35}$. FIG. 17(q) illustrates a value of a distance calculation reference signal $D_2$. FIG. 17(r) illustrates a value of a distance calculation reference signal $D_3$. FIG. 17(s) illustrates the valid data range. FIG. 17(t) illustrates the range in which measurement is possible.

The distance image sensor starts the process of generating the distance image. The light source control means 31 and the charge transfer control means 32 of the calculation circuit 12 control the timing at which the control pulses $G_1$ to $G_5$ and $G_D$ are output and the timing of the pulsed light $L_P$ within a period of one frame (light source control step and Charge transfer control step). Specifically, first, the charge transfer control means 32 sets durations of the control pulses $G_1$ to $G_5$ and $G_D$ to $T_1=T_0$. Then, the charge transfer control means 32 outputs the control pulse $G_1$ in the period from t=−2 to −1. Then, the charge transfer control means 32 outputs the control pulse $G_D$ in the period from t=−1 to 0. Then, the charge transfer control means 32 outputs the control pulse $G_2$ in the period from t=0 to +1. Then, the charge transfer control means 32 outputs the control pulse $G_3$ in the period from t=+1 to +2. Then, the charge transfer control means 32 outputs the control pulse $G_4$ in the period from t=+2 to +3. Then, the charge transfer control means 32 outputs the control pulse $G_5$ in the period from t=+3 to +4. Then, the charge transfer control means 32 outputs the control pulse $G_D$ in the period after t=+4. Thereafter, the voltage detection means of the pixel circuit 13 reads the detection signals $S_1$ to $S_5$. The read detection signals $S_1$ to $S_5$ are output to the calculation circuit 12 (voltage detection step).

Then, the calculation circuit 12 calculates the distance information for each pixel on the basis of the detection signals $S_1$ to $S_5$ output from each pixel circuit 13 (distance calculation step). The calculation for obtaining the distance information includes a step of obtaining the distance data validity determination signal $S_A$, a step of obtaining the difference values $S_{24}$ and $S_{35}$, a step for obtaining the distance calculation reference signals $D_2$ and $D_3$, a step for determining the valid data range, a step of determining a range in which measurement is possible and a step of obtaining the distance of the object S.

First, the distance data validity determination signal $S_A$ is obtained. The distance data validity determination signal generation means 33 obtains the distance data validity determination signal $S_A$ using Equation (28) below on the basis of the detection signals $S_1$ to $S_5$.

$$S_A = S_5 + S_4 + S_3 + S_2 - 4S_1 \tag{28}$$

Then, the distance data validity determination means 34 obtains a valid data range by comparing the value of the distance data validity determination signal $S_A$ with the threshold value $Th_1$. For example, the threshold value $Th_1$ may be 0.5. The distance data validity determination means 34 obtains a range of the distance data validity determination signal $S_A$ having a value larger than the threshold value $Th_1$ as the valid data range. According to FIGS. 17(l) and 17(o), a lower limit of the valid data range is between t=−1 and 0. An upper limit of the valid data range is between t=+3 and +4.

Then, the difference values $S_{24}$ and $S_{35}$ are obtained using Equations (29) and (30) below.

$$S_{24} = S_2 - S_4 \tag{29}$$

$$S_{35} = S_3 - S_5 \tag{30}$$

Then, the distance calculation reference signal generation means 36 obtains the distance calculation reference signals $D_2$ and $D_3$ on the basis of Equations (31) and (32) below.

$$D_2 = 1 - S_{24}/S_A \tag{31}$$

$$D_3 = 2 - S_{35}/S_A \tag{32}$$

The distance calculation reference signal selection means 37 selects one of the distance calculation reference signals $D_2$ and $D_3$ using the threshold values $Th_2$, $Th_3$, $Th_4$, and $Th_5$. Specifically, the distance calculation reference signal selection means 37 selects the distance calculation reference signal $D_2$ when $Th_2 \leq D_2 \leq Th_3$ is satisfied. On the other hand, the distance calculation reference signal selection means 37 selects the distance calculation reference signal $D_3$ when $Th_4 \leq D_3 \leq Th_5$ is satisfied.

For example, when the threshold values $Th_2$, $Th_3$, $Th_4$, and $Th_5$ are the following numerical values, t=0.21 to 3.19 can be obtained as a range in which measurement is possible.

Threshold value $Th_2$: 0.01
Threshold value $Th_3$: 1.5
Threshold value $Th_4$: 1.5
Threshold value $Th_5$: 2.99

The distance image sensor of the eighth embodiment can also obtain the same effects as the distance image sensors 10 and 10A of the first and third embodiments.

The distance image sensors 10 and 10A have been described above. However, the distance image sensors 10 and 10A may be implemented in various forms without being limited to the above-described embodiments.

In short, the distance image sensors 10 and 10A adopt at least one of the two operations in order to reduce the influence of flare. In the first operation, the detection signal $S_1$ is set at a timing temporally separated from the timing of the pulsed light $L_P$ in order to correct the background light. The second operation adjusts the number of detection signals $S_1$ in order to correct the background light. That is, the number of times the control pulse $G_1$ is output is decreased at a timing at which it is easy to receive an influence of flare, and the number of times the control pulse $G_1$ is output is increased at a timing at which it is difficult to receive an influence of flare.

The distance image sensors 10 and 10A may include one or both of the first operation and the second operation in the operation. Therefore, physical configurations of the distance image sensors 10 and 10A are not particularly limited, and may have a so-called 3-tap or more configuration. Further, schemes such as a subframe operation, a thinning operation, and multi-zone may be appropriately adopted and combined depending on specifications of the distance image sensors 10 and 10A.

REFERENCE SIGNS LIST

- 10 Distance image sensor (distance image measuring device)
- 11 Light source
- 12 Calculation circuit
- 13 Pixel circuit (pixel circuit unit)
- 21 Photoelectric conversion region
- 22$_1$ to 22$_4$ Charge reading region
- 24$_1$ to 24$_4$ Control electrodes
- 26$_1$ to 26$_4$ Voltage detection means
- 31 Light source control means
- 32 Charge transfer control means
- 33 Distance data validity determination signal generation means
- 34 Distance data validity determination means
- 35 Invalid pixel identification value generation means
- 36 Distance calculation reference signal generation means
- 37 Distance calculation reference signal selection means
- 38 Distance image generation means
- G$_1$ Control pulse (first control pulse)
- G$_2$ Control pulse (second control pulse)
- G$_3$ Control pulse (third control pulse)
- G$_4$ Control pulse (fourth control pulse)
- G$_5$ Control pulse (fifth control pulse)
- G$_D$ Control pulse ((M+1)-th control pulse)
- S$_1$ Detection signal (first detection signal)
- S$_2$ Detection signal (second detection signal)
- S$_3$ Detection signal (third detection signal)
- S$_4$ Detection signal (fourth detection signal)
- S$_5$ Detection Signal (fifth detection signal).

The invention claimed is:

1. A distance image measuring device comprising:
   a light source configured to generate pulsed light;
   a light source control means configured to control the light source so that the light source generates the pulsed light periodically and repeatedly;
   a pixel circuit unit including a photoelectric conversion region for converting light into charge, first to M-th (M is an integer equal to or larger than 3) charge reading regions provided close to the photoelectric conversion region and separated from each other, a charge discharging region for discharging the charge, and first to M-th control electrodes provided in correspondence to the photoelectric conversion region and the first to M-th charge reading regions to receive first to M-th control pulses for charge transfer between the photoelectric conversion region and the first to M-th charge reading regions, and including an (M+1)-th control electrode provided in correspondence to the photoelectric conversion region and the charge discharging region to receive an (M+1)-th control pulse for charge transfer between the photoelectric conversion region and the charge discharging region;
   a charge transfer control means configured to output the first to M-th control pulses to the first to M-th control electrodes in correspondence to the generation of the pulsed light by the light source control means, and output the (M+1)-th control pulse to the (M+1)-th control electrode during a period other than an output period of the first to M-th control pulses;
   a voltage detection means configured to read voltages of the first to M-th charge reading regions of the pixel circuit unit as first to M-th detection signals after the output of the first to M-th control pulses by the charge transfer control means; and
   a distance calculation means configured to repeatedly calculate a distance on the basis of the first to M-th detection signals,
   wherein the charge transfer control means performs
   a first operation of setting the timing at which the first control pulse is output to at least one of before the timing at which the pulsed light is generated and after the second to M-th control pulses are output and before the next pulsed light generated after the second to M-th control pulses are output, and
   a second operation of setting the timing at which the first control pulse is output to after the second to M-th control pulses are output and before the next pulsed light generated after the second to M-th control pulses are output, and setting the timing at which the first control pulse is output to the same time as or after the timing at which the pulsed light is generated and before the second to M-th control pulses are output, and
   the timing at which the first control pulse is output is determined by a predetermined output ratio,
   the output ratio is indicated by a variable K, and
   the distance calculation means multiplies a calculated value including a signal obtained by the first control pulse by the variable K as a weighting coefficient in the calculation of the distance.

2. The distance image measurement device according to claim 1, wherein the charge transfer control means sets timings of the second to M-th control pulses so that delay times of the second to M-th control pulses with respect to the timing at which the pulsed light is generated are shifted to different times for each of first to N-th (N is an integer equal to or larger than 2) subframe periods included in one frame period.

3. The distance image measurement device according to claim 2, wherein the charge transfer control means performs setting so that a rate of the number of outputs of at least the second control pulse among the second to M-th control pulses is decreased when delay times of the second to M-th control pulses with respect to the timing at which the pulsed light is generated becomes shorter during the second to N-th subframe periods.

4. The distance image measuring device according to claim 1, wherein the charge transfer control means sets a timing at which the second control pulse is output to be after a standby time shorter than a duration of the pulsed light from the timing at which the pulsed light is generated.

5. A distance image measuring device comprising:
   a light source configured to generate pulsed light;
   a light source control means configured to control the light source so that the light source generates the pulsed light periodically and repeatedly;
   a pixel circuit unit including a photoelectric conversion region for converting light into charge, first to M-th (M is an integer equal to or larger than 3) charge reading regions provided close to the photoelectric conversion region and separated from each other, a charge discharging region for discharging the charge, and first to M-th control electrodes provided in correspondence to the photoelectric conversion region and the first to M-th charge reading regions to receive first to M-th control pulses for charge transfer between the photoelectric conversion region and the first to M-th charge reading regions, and including an (M+1)-th control electrode provided in correspondence to the photoelectric conversion region and the charge discharging region to receive an (M+1)-th control pulse for charge transfer between the photoelectric conversion region and the charge discharging region;

a charge transfer control means configured to output the first to M-th control pulses to the first to M-th control electrodes in correspondence to the generation of the pulsed light by the light source control means, and output the (M+1)-th control pulse to the (M+1)-th control electrode during a period other than an output period of the first to M-th control pulses;

a voltage detection means configured to read voltages of the first to M-th charge reading regions of the pixel circuit unit as first to M-th detection signals after the output of the first to M-th control pulses by the charge transfer control means; and a distance calculation means configured to repeatedly calculate a distance on the basis of the first to M-th detection signals, wherein the charge transfer control means performs a third operation of setting the timing at which the first control pulse is output to at least one of before the timing at which the pulsed light is generated and after the second to M-th control pulses are output and before the next pulsed light generated after the second to M-th control pulses are output, and a fourth operation of setting a timing at which the first control pulse is output to the same time as and after the timing at which the pulsed light is generated and before the second to M-th control pulses are output, the timing at which the first control pulse is output is determined by a predetermined output ratio, the output ratio is indicated by a variable K, and the distance calculation means multiplies a calculated value including a signal obtained by the first control pulse by the variable K as a weighting coefficient in the calculation of the distance.

6. The distance image measurement device according to claim 5, wherein the charge transfer control means performs setting so that the delay times of the second to M-th control pulses with respect to the timing at which the pulsed light is generated in the third operation is the same as the delay time in the fourth operation, and performs setting so that the number of times of the third operation performed in one frame becomes larger than the number of times of the fourth operation.

* * * * *